United States Patent
Higuchi et al.

(10) Patent No.: US 11,391,482 B2
(45) Date of Patent: Jul. 19, 2022

(54) REMOTE CONTROL DEVICE FOR AN AIR CONDITIONING SYSTEM

(71) Applicant: DAIKIN INDUSTRIES, LTD., Osaka (JP)

(72) Inventors: Tatsuya Higuchi, Osaka (JP); Asuka Yagi, Osaka (JP); Takeshi Yoshimura, Osaka (JP); Ryousuke Yamamoto, Osaka (JP); Keiya Nagahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 172 days.

(21) Appl. No.: 16/075,544

(22) PCT Filed: Feb. 7, 2017

(86) PCT No.: PCT/JP2017/004440
§ 371 (c)(1),
(2) Date: Aug. 3, 2018

(87) PCT Pub. No.: WO2017/141774
PCT Pub. Date: Aug. 24, 2017

(65) Prior Publication Data
US 2019/0041080 A1    Feb. 7, 2019

(30) Foreign Application Priority Data
Feb. 19, 2016   (JP) .............................. JP2016-029794

(51) Int. Cl.
*G05B 99/00*   (2006.01)
*F24F 11/56*   (2018.01)
(Continued)

(52) U.S. Cl.
CPC .............. *F24F 11/56* (2018.01); *F24F 11/30* (2018.01); *F24F 11/52* (2018.01); *F24F 11/54* (2018.01);
(Continued)

(58) Field of Classification Search
CPC ............ F24F 11/30; F24F 11/52; F24F 11/54; F24F 11/56; F24F 11/58; F24F 3/00;
(Continued)

(56) References Cited

U.S. PATENT DOCUMENTS

| 2004/0010347 A1 | 1/2004 | Yamanashi et al. |
| 2006/0123811 A1* | 6/2006 | Ha .......................... F24F 11/62 62/175 |

(Continued)

FOREIGN PATENT DOCUMENTS

| EP | 2 058 598 A2 | 6/2008 |
| JP | 10-232044 A | 9/1998 |

(Continued)

OTHER PUBLICATIONS

Ecobee, "User Guide ecobee3", Toronto:ecobee, 2014 (accessed from <<https://www.ecobee.com/wp-content/uploads/2014/09/ecobee3_UserGuide1.pdf>> on May 20, 2020). (Year: 2014).*

(Continued)

*Primary Examiner* — Suresh Suryawanshi
(74) *Attorney, Agent, or Firm* — Global IP Counselors, LLP

(57) ABSTRACT

An air conditioning system includes a plurality of air conditioning indoor units installed in a target space, a plurality of remote control devices corresponding to the air conditioning indoor units, and a controller. The remote control device has a command input to set the corresponding air conditioning indoor unit or the remote control device. The controller performs a process based on the command input to the remote control device. Each remote control device includes a communicating unit that performs a communication with the corresponding air conditioning indoor unit, and a short range wireless communicating unit that performs a short range wireless communication with a communicating (Continued)

apparatus having a function of the short range wireless communication. The command is input by receiving a signal transmitted from the communicating apparatus by the short range wireless communication, at the short range wireless communicating unit.

15 Claims, 15 Drawing Sheets

(51) Int. Cl.
  H04W 4/70  (2018.01)
  H04W 4/38  (2018.01)
  H04W 4/33  (2018.01)
  H04W 4/80  (2018.01)
  G08C 17/02  (2006.01)
  F24F 11/58  (2018.01)
  F24F 11/62  (2018.01)
  F24F 11/30  (2018.01)
  F24F 11/52  (2018.01)
  F24F 11/54  (2018.01)
  F24F 3/00  (2006.01)

(52) U.S. Cl.
  CPC .............. *F24F 11/58* (2018.01); *F24F 11/62* (2018.01); *G08C 17/02* (2013.01); *H04W 4/33* (2018.02); *H04W 4/38* (2018.02); *H04W 4/70* (2018.02); *H04W 4/80* (2018.02); *F24F 3/00* (2013.01)

(58) Field of Classification Search
  CPC .......... G08C 17/02; H04W 4/33; H04W 4/38; H04W 4/70; H04W 4/80; G05B 2219/2614
  USPC .......................................................... 700/276
  See application file for complete search history.

(56) References Cited

U.S. PATENT DOCUMENTS

| | | | | |
|---|---|---|---|---|
| 2007/0173978 A1* | 7/2007 | Fein | ........................ | G05B 15/02 700/275 |
| 2010/0070092 A1* | 3/2010 | Winter | ................. | F24F 11/0008 700/278 |
| 2010/0084918 A1* | 4/2010 | Fells | ........................ | H02J 5/005 307/32 |
| 2010/0163633 A1* | 7/2010 | Barrett | .................. | F24H 9/2064 236/49.3 |
| 2010/0292864 A1* | 11/2010 | Sung | .......................... | F24F 1/06 700/300 |
| 2011/0151837 A1* | 6/2011 | Winbush, III | .......... | H04W 8/22 455/412.1 |
| 2012/0026726 A1* | 2/2012 | Recker | .................... | F21S 9/037 362/157 |
| 2012/0325919 A1* | 12/2012 | Warren | .............. | G05D 23/1902 236/1 C |
| 2013/0173064 A1* | 7/2013 | Fadell | ..................... | G01J 5/041 700/276 |
| 2014/0052300 A1* | 2/2014 | Matsuoka | .......... | G05D 23/1917 700/276 |
| 2014/0217186 A1* | 8/2014 | Kramer | .............. | G05D 23/1905 236/1 C |
| 2015/0048924 A1* | 2/2015 | Feldstein | .................. | G07C 9/27 340/5.51 |
| 2015/0051739 A1* | 2/2015 | Song | ...................... | G05B 15/02 700/276 |
| 2015/0057814 A1* | 2/2015 | Mighdoll | ............... | G05B 15/02 700/278 |
| 2015/0153057 A1* | 6/2015 | Matsuoka | ............... | G05B 15/02 700/278 |
| 2015/0330654 A1* | 11/2015 | Matsuoka | .............. | G05B 15/02 700/278 |
| 2015/0362926 A1 | 12/2015 | Yarde et al. | | |
| 2015/0362928 A1* | 12/2015 | Schmidlin | .......... | G05B 19/0426 700/276 |
| 2016/0062332 A1* | 3/2016 | Call | ........................ | F24F 11/83 700/276 |
| 2016/0138821 A1* | 5/2016 | Shaull | .................... | G05B 15/02 700/276 |
| 2016/0357199 A1* | 12/2016 | Matlock | ................ | F24F 13/082 |
| 2017/0082993 A1* | 3/2017 | Narain | ................. | H04B 5/0056 |
| 2017/0146261 A1* | 5/2017 | Rogers | ............... | G05D 23/1904 |
| 2017/0234566 A1* | 8/2017 | Gerszewski | ............ | H04W 4/33 700/276 |
| 2018/0363936 A1* | 12/2018 | Inoue | ..................... | G07C 9/215 |

FOREIGN PATENT DOCUMENTS

| | | |
|---|---|---|
| JP | 2003-21380 A | 1/2003 |
| JP | 2011-69561 A | 4/2011 |
| JP | 2015-224858 A | 12/2015 |
| JP | 2015-230161 A | 12/2015 |
| JP | 2015224858 A | * 12/2015 |
| KR | 20170090668 A | * 8/2017 |

OTHER PUBLICATIONS

International Preliminary Report of corresponding PCT Application No. PCT/JP2017/004440 dated Aug. 30, 2018.
International Search Report of corresponding PCT Application No. PCT/JP2017/004440 dated May 9, 2017.
European Search Report of corresponding EP Application No. 17 75 3032.6 dated Sep. 17, 2019.

* cited by examiner

TB1

| | 20a | 20b | 20c | 20d | 20e | 20f |
|---|---|---|---|---|---|---|
| 0:00 | STOP | STOP | STOP | STOP | STOP | COOLING OPERATION |
| 1:00 | STOP | STOP | STOP | STOP | STOP | COOLING OPERATION |
| 2:00 | STOP | STOP | STOP | STOP | STOP | COOLING OPERATION |
| ⋮ | ⋮ | ⋮ | ⋮ | ⋮ | ⋮ | ⋮ |
| 7:00 | STOP | STOP | STOP | STOP | STOP | COOLING OPERATION |
| 8:00 | COOLING OPERATION | COOLING OPERATION | COOLING OPERATION | COOLING OPERATION | COOLING OPERATION | COOLING OPERATION |
| 9:00 | COOLING OPERATION | COOLING OPERATION | COOLING OPERATION | COOLING OPERATION | COOLING OPERATION | COOLING OPERATION |
| 10:00 | COOLING OPERATION | COOLING OPERATION | COOLING OPERATION | COOLING OPERATION | COOLING OPERATION | COOLING OPERATION |
| ⋮ | ⋮ | ⋮ | ⋮ | ⋮ | ⋮ | ⋮ |
| 21:00 | COOLING OPERATION | COOLING OPERATION | COOLING OPERATION | COOLING OPERATION | COOLING OPERATION | COOLING OPERATION |
| 22:00 | STOP | STOP | STOP | STOP | STOP | COOLING OPERATION |
| 23:00 | STOP | STOP | STOP | STOP | STOP | COOLING OPERATION |

| | VARIABLE | VALUE |
|---|---|---|
| OUTDOOR UNIT 10 | UNIT ADDRESS | 101 |
| | CENTRAL CONTROL ADDRESS | 1001 |
| | IDENTIFICATION INFORMATION | A1 |
| FIRST INDOOR UNIT 20a | UNIT ADDRESS | 111 |
| | CENTRAL CONTROL ADDRESS | 1011 |
| | IDENTIFICATION INFORMATION | B1 |
| SECOND INDOOR UNIT 20b | UNIT ADDRESS | 112 |
| | CENTRAL CONTROL ADDRESS | 1012 |
| | IDENTIFICATION INFORMATION | B2 |
| SIXTH INDOOR UNIT 20f | UNIT ADDRESS | 116 |
| | CENTRAL CONTROL ADDRESS | 1016 |
| | IDENTIFICATION INFORMATION | B6 |
| FIRST REMOTE CONTROLLER 30a | UNIT ADDRESS | 121 |
| | CENTRAL CONTROL ADDRESS | 1021 |
| | IDENTIFICATION INFORMATION | C1 |
| SECOND REMOTE CONTROLLER 30b | UNIT ADDRESS | 122 |
| | CENTRAL CONTROL ADDRESS | 1022 |
| | IDENTIFICATION INFORMATION | C2 |
| SIXTH REMOTE CONTROLLER 30f | UNIT ADDRESS | 126 |
| | CENTRAL CONTROL ADDRESS | 1026 |
| | IDENTIFICATION INFORMATION | C6 |
| CENTRAL REMOTE CONTROLLER 40 | UNIT ADDRESS | NULL |
| | CENTRAL CONTROL ADDRESS | 1031 |
| | IDENTIFICATION INFORMATION | D1 |

| | INSTALLATION PLACE | NAME | CEILING HEIGHT | LARGENESS | EXISTING FLOOR |
|---|---|---|---|---|---|
| FIRST INDOOR UNIT 20a | SP1 | MR 1 | 2.7m | 56m² | 11F |
| SECOND INDOOR UNIT 20b | SP2 | MR 2 | 2.7m | 56m² | 11F |
| THIRD INDOOR UNIT 20c | SP3 | OFFICE 1 | 2.7m | 56m² | 11F |
| FOURTH INDOOR UNIT 20d | SP4 | OFFICE 2 | 2.7m | 56m² | 11F |
| FIFTH INDOOR UNIT 20e | SP5 | OFFICE 3 | 2.7m | 56m² | 11F |
| SIXTH INDOOR UNIT 20f | SP6 | SERVER ROOM | 2.7m | 56m² | 11F |

FIG. 14

REMOTE CONTROL DEVICE FOR AN AIR CONDITIONING SYSTEM

CROSS-REFERENCE TO RELATED APPLICATIONS

This U.S. National stage application claims priority under 35 U.S.C. § 119(a) to Japanese Patent Application No. 2016-029794, filed in Japan on Feb. 19, 2016, the entire contents of which are hereby incorporated herein by reference.

TECHNICAL FIELD

The present invention relates to an air conditioning system.

BACKGROUND ART

Conventionally, an air conditioning system is widely used, the system having an air conditioning indoor unit installed in a target space for conditioning the air inside and a remote control device as an input device of various commands. For example, an air conditioning system disclosed in Japanese Patent Laid-open Publication No. H10-232044 performs various settings based on commands that are input via input keys provided in a remote control device. Examples of the various settings performed based on the command inputs through the remote control device include an initial setting and a setting for acquiring data performed by an operator at the time of installation of or at the time of maintenance of the air conditioning indoor units, or user settings such as switching of an operation state and registering of an operation schedule, which are performed b a user.

SUMMARY

Technical Problem

Here, in a facility such as building, factory, warehouse or public facility, where a plurality of air conditioning indoor units is installed, a plurality of remote control devices is installed according to the number of air conditioning indoor units. Because of such installation of the remote control devices, when various settings like those described above are performed, commands are individually input to the respective remote control devices in some cases. In such cases, with the conventional air conditioning system as described in Japanese Patent Laid-open Publication No. H10-232044, each command has to be input by operating the input keys with respect to each of the plurality of remote control devices. As a result, the setting operation becomes complicated, making it difficult to reduce the possibility of increase in labor and time required for the operation and the occurrence of setting errors, for example. In this situation, a demand for an air conditioning system has been recently uprising, in which command input to a plurality of remote control devices can be more easily performed.

It is, therefore, a problem of the present invention to be solved is to provide an air conditioning system in which command input to a plurality of remote control devices can be more easily performed.

Solution to Problem

An air conditioning system according to a first aspect of the present invention has a plurality of air conditioning indoor units, a plurality of remote control devices, and a controller. The air conditioning indoor unit is installed in a target space. The remote control device is configured and arranged to correspond to any of the air conditioning indoor units. The remote control device is configured and arranged to be input a command for setting of the corresponding air conditioning indoor unit or of the remote control device itself. The controller is configured and arranged to perform a process based on the command input to the remote control device. Each of the remote control devices includes a communicating unit and a short range wireless communicating unit. The communicating unit is configured and arranged to perform a communication with a corresponding air conditioning indoor unit. The short range wireless communicating unit is configured and arranged to perform a short range wireless communication with a communicating apparatus having a function of the short range wireless communication. Each of the remote control devices is configured and arranged to be input a command by receiving a signal transmitted from the communicating apparatus by the short range wireless communication, at the short range wireless communicating unit.

With the air conditioning system according to the first aspect of the present invention, each of the remote control devices includes a short range wireless communicating unit for performing a short range wireless communication with a communicating apparatus having a function of short range wireless communicating, and accepts input of a command by allowing the short range wireless communicating unit to acquire a signal transmitted from the communicating apparatus by short range wireless communication. With this configuration, in a case where command inputs are performed to each of a plurality of remote control devices for performing various settings, it is made possible to transmit the commands from the communicating apparatus to the remote control device by short range wireless communication. That is, the commands that having been input or stored in advance in a communicating apparatus can be transmitted to each of the remote control devices by short range wireless communication. As a result thereof, without operation of the input keys of each of the remote control devices, commands can be input to a plurality of remote control devices. Thus, command inputs to a plurality of remote control devices is facilitated. That is, the extensively complicated work for various settings can be decreased, which reduces the possibility of increase in the labor and time required for the operation and the occurrence of setting errors, for example.

Note that "various settings" herein include for example: operation settings such as temperature setting, operation mode, fan speed setting, air direction setting, timer setting, schedule setting; initial settings performed at the time of installation or at the time of maintenance; settings of a display mode in a case in which a displaying unit is installed in the remote control device; and settings for transmitting data from the remote control device to the communicating apparatus.

The "air conditioning indoor unit" herein is a device which is installed in a target space for conditioning the air inside. For example, the air conditioning indoor unit is an indoor unit of an air conditioner, an air cleaner, a ventilator, a dehumidifier or the like.

In addition, the "short range wireless communication" herein is a communication method enabling a bidirectional communication in a short range from several centimeters to about 1 meter, and examples thereof includes an NFC (Near Field Communication) using a frequency of 13.56 MHz.

An air conditioning system according to a second aspect of the present invention is the air conditioning system according to the first aspect, wherein the command input to the remote control device includes an initial setting command. The initial setting command is a command for an initial setting of the air conditioning indoor unit or of the remote control device and the initial setting is performed at the time of installation of or at the time of maintenance of the air conditioning indoor unit and/or of the remote control device.

With this configuration, when the initial settings are performed at the time of installation, maintenance, etc. of the air conditioning indoor unit, the operations for the initial settings can be avoided from the complication, which reduces the possibility of increase in the labor and time required for the operation and the occurrence of setting errors, for example.

An air conditioning system according to a third aspect of the present invention is the air conditioning system according to the second aspect, wherein the initial setting includes a local information registration setting, a time setting, a temperature sensor selecting setting, a notification timing setting, and a display mode setting. The local information registration setting is a setting for registering the local information of the target space. The time setting is a setting for adjusting a time of a clock function in the remote control device. The temperature sensor selecting setting is a setting for selecting a temperature sensor which works as a target of measurement in a case where a plurality of temperature sensors are disposed in the target space. The notification timing setting is a setting for determining a timing of performing a notification for prompting cleaning or changing of a filter of the air conditioning indoor unit. The display mode setting is a setting for determining a display mode of a displaying unit of the remote control device.

With this configuration, when the initial settings are performed at the time of installation, maintenance, etc. of the air conditioning indoor unit, for the settings also (local information registration setting, time setting, temperature sensor selecting setting, notification timing setting, or display mode setting) which were conventionally complicated especially in terms of command input, the operations for the settings can be avoided from the complication, which reduces the possibility of increase in the labor and time required for the operation and the occurrence of setting errors, for example.

Note that "local information" herein includes, for example, the ceiling height, the largeness, the existing floor, the position in the entire building, and the name of a target space in which the air conditioning indoor unit is installed; or the information such as location of the target space, and the information on whether or not a summer time is applied in the target space.

An air conditioning system according to a fourth aspect of the present invention is the air conditioning system according to any of the first aspect to the third aspect, wherein the command input to the remote control device includes a data transmission requesting command. The data transmission requesting command is a command for requesting the remote control device (air conditioning system) for a transmission of predetermined data. The controller causes the data requested by the data transmission requesting command that is input to the remote control device, to be transmitted from the short range wireless communicating unit to the communicating apparatus.

With this configuration, when a data transmission requesting command for a data transmission setting to a plurality of remote control devices is input, which was conventionally complicated especially in terms of command input, the operation can be avoided from the complication, which reduces the possibility of increase in the labor and time required for the operation and the occurrence of setting errors, for example.

Note that "predetermined data" herein includes any data for, for example, the history information for specifying the operation state, failure timing, etc. of an air conditioning indoor unit, the information for specifying the operation states of various actuators (e.g., rotation speed of the compressor or of the fan, or opening degrees of various valves) at a predetermined time, the information for specifying the detected values of various sensors at a predetermined time, the information for specifying the setting states for various settings at a predetermined time, or the information on power consumption.

An air conditioning system according to a fifth aspect of the present invention is the air conditioning system according to the fourth aspect, wherein each of the remote control devices further includes a transmission data storage unit. The transmission data storage unit is configured and arranged to store the data to be transmitted to the communicating apparatus in response to input of the data transmission requesting command. The controller stores the data, which may be requested by the data transmission requesting command, in the transmission data storage unit.

With this configuration, any information which may be requested by the data transmission requesting command can be preliminarily stored in the transmission data storage unit. As a result thereof when the data transmission requesting command is input, the time period required for transferring the data to the communicating apparatus can be reduced. Thus, the operation time required for retrieving the data in the air conditioning system can be further reduced.

An air conditioning system according to a sixth aspect is the air conditioning system according to the fourth aspect or the fifth aspect, wherein the data transmitted from the remote control device to the communicating apparatus in response to the data transmission requesting command includes specifying data. The specifying data is information capable of specifying a difference between a state before a switching and a state after the switching in setting items of which setting content has been switched based on the command.

With this configuration, the specifying data capable of identifying the difference in the setting items between the state before the switching and the state after the switching can be transmitted from the remote control device to the communicating apparatus based on the data transmission requesting command, the items having the setting content that can be switched based on the command. As a result thereof, the difference identified by the specifying data can be displayed on the communicating apparatus that has acquired the specifying data or on an information processing apparatus to which the specifying data is transferred from the communicating apparatus. Accordingly, an operator can easily grasp the difference in the setting items between the state before a switching and the state after the switching, the items having setting items that can be switched, which improves convenience of the system. In addition, the acquired specifying data can be promptly analyzed or processed in the installation place the target space), thus improving the convenience.

An air conditioning system according to a seventh aspect is the air conditioning system according to any of the first aspect to the sixth aspect, wherein the short range wireless communicating unit includes an input command storage unit and a processing unit. The input command storage unit is configured and arranged to store a command that is input. The processing unit is configured and arranged to perform a process, when a command is input from the communicating apparatus, in one of a first processing mode and a second processing mode. The first processing mode is a mode for storing the command being input in the input command storage unit. The second processing mode is a mode for outputting the command being input to the controller without storing into the input command storage unit. The processing unit is configured and arranged to perform the process in the first processing mode when the processing unit, by being approaching by the communicating apparatus, in a state of not being supplied with a power source gets supplied with a power source and is input a command. The processing unit is configured and arranged to perform the process in the second processing mode when the processing unit receives the command input in a state of being supplied with the power source.

With this configuration, regardless of whether or not the power source is supplied to the short range wireless communicating unit, a command can be input by short range wireless communication. In addition, when a command is input in a state of the short range wireless communicating unit supplied with a power source, the input command is output to the controller, without being stored in the input command storage unit. Thus, compared with the case in which a command is input to the short range wireless communicating unit in the state of not being supplied with a power source, the transmission time for the input command is shortened, thus reducing the time until the result for the input command is reflected. Thus, the possibility of increase in labor and time required for the operations for various settings can be further reduced.

An air conditioning system according to an eighth aspect is the air conditioning system according to any of the first aspect to the seventh aspect, wherein the command input to the remote control device includes a schedule setting command. The schedule setting command is for setting of an operation schedule of the air conditioning indoor unit.

With this configuration, when a setting of registration of an operation schedule is performed, which was conventionally complicated especially in terms of command input, the operation for the setting can be avoided from the complication, which reduces the possibility of increase in the labor and time required for the operation and the occurrence of setting errors, for example.

An air conditioning system according to a ninth aspect of the present invention is the air conditioning system according to any of the first aspect to the eighth aspect, wherein each of the remote control devices is assigned a central address used for a communication with a central remote controller. The central remote controller integrally controls the operations of the plurality of the air conditioning indoor units or of the plurality of the remote control devices. The command input to the remote control device includes a central address setting command. The central address setting command is a command for a setting of the central address.

With this configuration, when the setting of the central address is performed, which was conventionally complicated especially in terms of command input, the operations for the settings can be avoided from the complication, which reduces the possibility of increase in the labor and time required for the operation and the occurrence of setting errors, for example.

An air conditioning system according to a tenth aspect of the present invention is the air conditioning system according to any of the first aspect to the ninth aspect, wherein the remote control devices each further includes a communication state displaying unit. The communication state displaying unit is configured and arranged to display information indicating that the remote control device is in communication with the air conditioning indoor unit when the remote control device is communicating with the air conditioning indoor unit via the communicating unit.

This improves convenience of the system. For example, even when a long time is required for communication between the remote control device and the air conditioning indoor unit, the operator can grasp the progress state of the process for the command, thus improving convenience of the system. Furthermore, when an input of a command is necessary every time the communication between the remote control device and the air conditioning indoor unit is completed (that is, when a command needs to be input to the remote control device several times), the timing of inputting the command can be easily grasped, thus improving convenience.

Advantageous Effects of Invention

With the air conditioning system according to the first aspect of the present invention, without operation of the input keys of each of the remote control devices, commands can be input to a plurality of remote control devices. Thus, command inputs to a plurality of remote control devices is facilitated. That is, the extensively complicated work for various settings can be decreased, which reduces the possibility of increase in the labor and time required for the operation and the occurrence of setting errors, for example.

With the air conditioning system according to the second aspect of the present invention, when the initial settings are performed at the time of installation, maintenance, etc. of the air conditioning indoor unit, the operations for the initial settings can be avoided from the complication, which reduces the possibility of increase in the labor and time required for the operation and the occurrence of setting errors, for example.

With the air conditioning system according to the third aspect of the present invention, when the initial settings are performed at the time of installation, maintenance, etc. of the air conditioning indoor unit, for the settings also (local information registration setting, time setting, temperature sensor selecting setting, notification timing setting, or display mode setting) which were conventionally complicated especially in terms of command input, the operations for the settings can be avoided from the complication, which reduces the possibility of increase in the labor and time required for the operation and the occurrence of setting errors, for example.

With the air conditioning system according to the fourth aspect of the present invention, when a data transmission requesting command for a data transmission setting to a plurality of remote control devices is input, which was conventionally complicated especially in terms of command input, the operation can be avoided from the complication, which reduces the possibility of increase in the labor and time required for the operation and the occurrence of setting errors, for example.

With the air conditioning system according to the fifth aspect of the present invention, the operation time for retrieving data in the air conditioning system can be further reduced.

With the air conditioning system according to the sixth aspect of the present invention, convenience is improved.

With the air conditioning system according to the seventh aspect of the present invention, the labor and time required for the operations for various settings are further decreased.

With the air conditioning system according to the eighth aspect of the present invention, when the setting on the registration of the operation schedule which setting conventionally had a special trouble in inputting of the command is performed, the operations for the settings can be avoided from the complication, which reduces the possibility of increase in the labor and time required for the operation and the occurrence of setting errors, for example.

With the air conditioning system according to the ninth aspect of the present invention, when the setting of the central address which setting conventionally had a special trouble in inputting of the command is performed, the operations for the settings can be avoided from the complication, which reduces the possibility of increase in the labor and time required for the operation and the occurrence of setting errors, for example.

With the air conditioning system according to the tenth aspect of the present invention, convenience is improved.

BRIEF DESCRIPTION OF THE DRAWINGS

FIG. 12 is a schematic diagram showing one example of an operation schedule table.

FIG. 13 is a schematic diagram showing one example of an address table.

FIG. 14 is a schematic diagram showing one example of a local information table.

DESCRIPTION OF EMBODIMENTS

Hereinafter, description will be made on an air conditioning system 100, according to one embodiment of present invention. The following embodiment is a specific example of the prevent invention and is not intended to limit the technical scope of the present invention and may be properly changed within a scope that does not deviate from the gist of the present invention.

(1) AIR CONDITIONING SYSTEM 100

Figure 1:
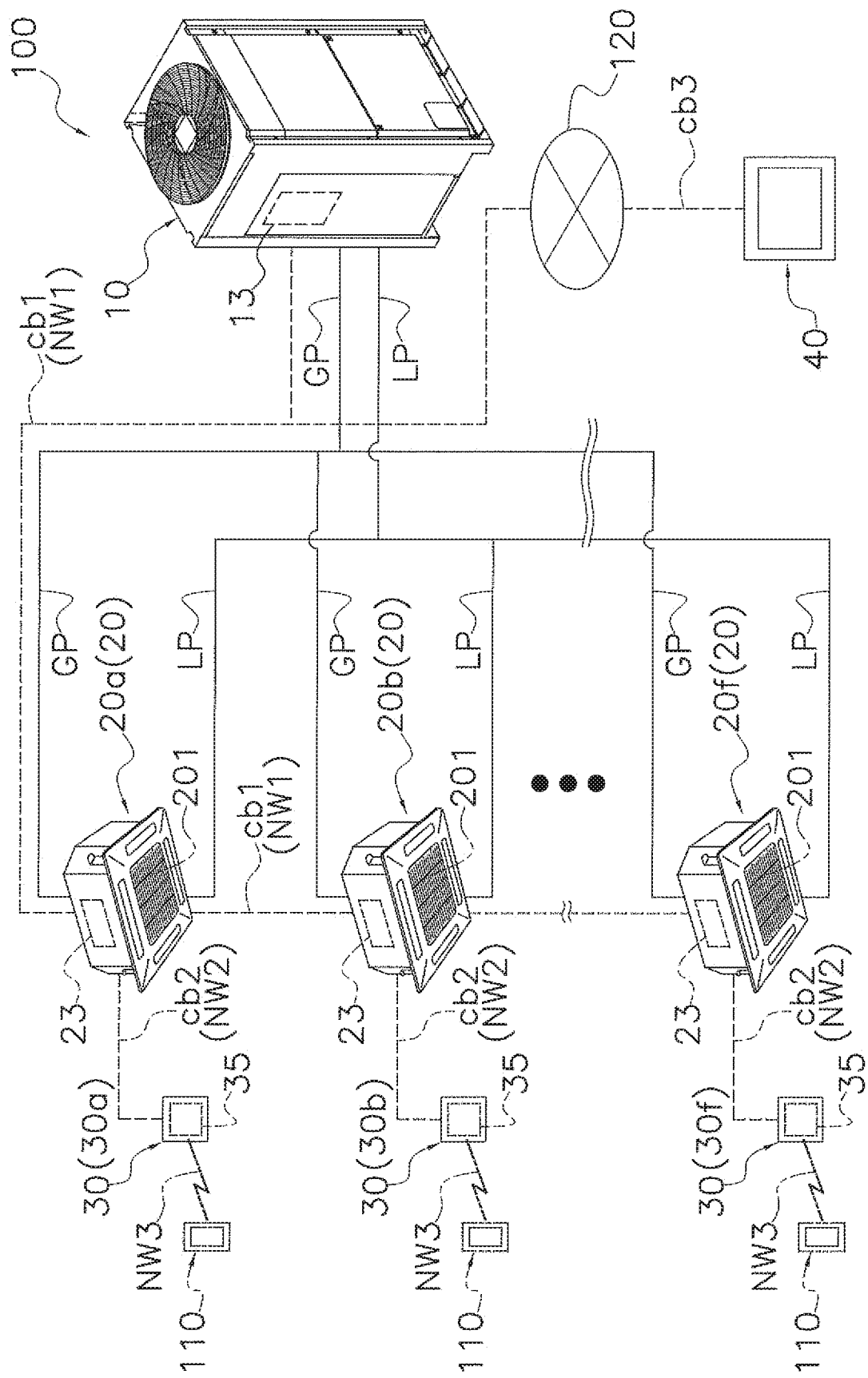
FIG. 1 is a schematic structural view of an air conditioning system.

FIG. 1 is a schematic structural view of the air conditioning system 100. The air conditioning system 100 is a system which accomplishes an air conditioning such as air cooling, air heating, etc. in a target space included in an architectural structure such as house, building, factory, public facility, etc. Especially, the air conditioning system 100 is supposed to be applied to any facility formed with a large target space or a plurality of target spaces requiring a plurality of air conditioning indoor units. In this embodiment, the air conditioning system 100 is applied to a facility 1 including a plurality (herein, 6) of target spaces SP (SP1, SP2, SP3, SP4, SP5 and SP6) (Refer to FIG. 3).

The air conditioning system 100 includes a refrigerant circuit. With the refrigerant circuit circulating a refrigerant to thereby implement a refrigerant cycle in a vapor-compression manner, the air conditioning system 100 performs a cooling or a heating of the target spaces SP. Having a plurality of operation modes including a cooling mode and a heating mode, the air conditioning system 100 performs operations according to the operation modes. Specifically, the air conditioning system 100, at the time of a cooling mode, performs a cooling operation and, at the time of a heating mode, performs a heating operation.

The air conditioning system 100, mainly, has one outdoor unit 10 as a heat source unit, a plurality (herein, 6) of indoor units 20 as a utilization unit, a plurality (herein, 6) of remote control devices 30 (hereinafter, referred to as "remote controller") each as an input device for inputting commands for various settings, a central remote controller 40, and a controller 50.

In the air conditioning system 100, a refrigerant communication pipe (a gas communicating pipe CP and a liquid communicating pipe LP) connect the outdoor unit 10 with each of the indoor units 20 to constitute the refrigerant circuit. The air conditioning system 100 also establishes a plurality of communication networks (a first network NW1, a second network NW2 and a third network NW3) having a function as a path for transmitting signals between respective units. Furthermore, in the air conditioning system 100, the outdoor unit 10, each of the indoor units 20, each of the remote controllers 30, and the central remote controller 40 are connected by the communication networks to constitute the controller 50 (refer to FIG. 10).

Here, the remote controller 30 is configured to have a communication (short range wireless communication) with a portable communication terminal 110 (hereinafter, simply referred to as "terminal 110") which has a function of a short range wireless communication: the terminal 110 being held by a serviceman in charge of an operation at the time of installation or at the time of maintenance of the air conditioning system 100, or held by a manager of or a user of the air conditioning system 100. By receiving signals transmitted from the terminal 110, the remote controller 30 accepts input of commands for various settings of the air conditioning system 100. In other words, the air conditioning system 100 can cause the terminal 110 to function as a "command output device" for outputting commands for various settings.

In addition, by transmitting a signal to the terminal 110, the remote controller 30 causes a transmission of data held by the air conditioning system 100. In other words, the air conditioning system 100 can cause the terminal 110 to function as a "data retrieving device" for retrieving various data from the air conditioning system 100.

Further, in this embodiment, the short range wireless communication performed between the remote controller 30 and the terminal 110 is an NFC (Near Field Communication) using a frequency of 13.56 MHz. The NFC is a communication method allowing a bidirectional communication in a short range of from several centimeters to about 1 meter.

Furthermore, in this embodiment, the commands input to the remote controller 30 are input as commands for various settings, including operation settings such as setting temperature, operation mode, fan speed, air direction, timer setting, schedule setting, etc.; initial setting performed at the time of installation or at the time of maintenance; setting of a display mode (display mode setting) in the remote controller 30 (a remote controller displaying unit 32 to be described afterward); and setting for transmitting data from the remote control device to the communicating apparatus.

Figure 2:
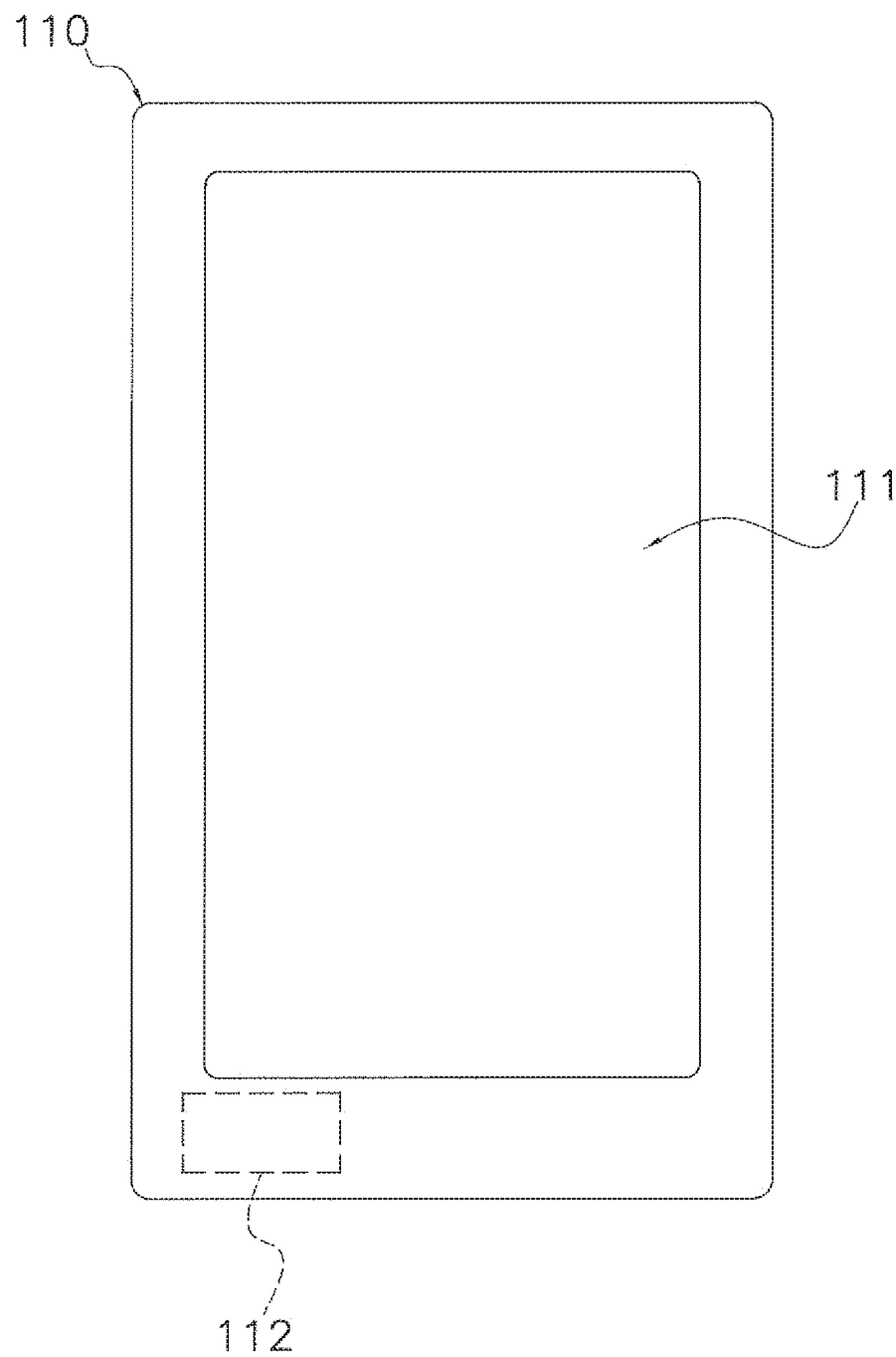
FIG. 2 is an external view showing one example of an information processing terminal for outputting a command to a remote controller by short range wireless communication.

In this embodiment, the terminal 110 (the communicating apparatus) is supposed to be an information processing terminal such as smartphone, tablet PC, etc., having a touch screen 111 as an input unit and a communication module 112 including an antenna and a reader/writer for short range wireless communication, where the touch screen 111 and the communication module 112 are those shown, for example, in FIG. 2. However, the terminal 110 may be other information processing apparatus such as laptop PC or the like. In addition, in place of the touch screen 111 or together with the touch screen 111, a physical key (hardware key) as an input unit may be included in the terminal 110.

With a predetermined application installed to the terminal 110, the terminal 110 performs, by using a predetermined protocol, a short range wireless communication with the remote controller 30, thus making it possible to perform a mutual transmitting-receiving of the signals. In this embodiment, the remote controller 30 (in more detail, a short range wireless communicating unit 34 to be described afterward) and the terminal 110, when approaching each other, perform a short range wireless communication between the remote controller 30 and the terminal 110.

(1-1) Outdoor Unit 10

The outdoor unit 10 is installed outside a room (outside the target spaces SP). The outdoor unit 10 mainly has equipment (not shown) as elements constituting the refrigerant circuit, such as a plurality of refrigerant pipes, a compressor, a four path switching valve, an outdoor heat exchanger, and an expansion valve. The outdoor unit 10 also has an outdoor fan (not shown) for generating an airflow for making a heat exchange with the refrigerant in the outdoor heat exchanger. Furthermore, the outdoor unit 10 has a sensor 12 (refer to FIG. 10) for detecting a predetermined value: examples of the sensor 12 including a temperature sensor for detecting a refrigerant temperature or an outside air temperature.

The outdoor unit 10 also has an outdoor unit control unit 13 for controlling the operation of an actuator 11 (refer to FIG. 10) in the outdoor unit 10: examples of the actuator 11 including a compressor, a four path switching valve, an expansion valve, and an outdoor fan. The outdoor unit control unit 13 is installed to a base plate that is disposed in the outdoor unit 10. The outdoor unit control unit 13 includes a CPU (hereinafter, described as "outdoor unit CPU 131") and a memory (hereinafter, described as "outdoor unit storage unit 132") (refer to FIG. 9).

In addition, the outdoor unit control unit 13 includes a communication module (hereinafter, described as "outdoor unit communicating unit 133") (refer to FIG. 9) for communicating with other units (the indoor unit 20, the remote controller 30, the central remote controller 40, etc.). At the outdoor unit communicating unit 133, the outdoor unit control unit 13 performs a mutual transmitting-receiving of signals with each of the indoor units 20 (in more detail, an indoor unit control unit 23 to be described afterword) via a communication cable cb1 (first network NW1).

Furthermore, at the outdoor unit communicating unit 133, the outdoor unit control unit 13 is connected with a wide area network 120 via the communication cable cb1, so as to be configured to have a mutual communication with apparatuses (herein, the central remote controller 40) connected to the wide area network 120. Note that the wide area network 120 is a WAN (Wide Area Network) such as Internet, etc.

The outdoor unit control unit 13 is assigned: as a communication address used for a communication in the first network NW1 and the second network NW2, a unit address used for the communication with the indoor unit 20 (the indoor unit control unit 23) or with the remote controller 30 (a remote controller control unit 35); and a central control address used for the communication with the central remote controller 40. The unit address is a communication address preliminarily assigned before factory shipment or a communication address automatically assigned based on a control program at the time of inputting of a power source. The central control address is a communication address assigned at the time of the initial setting done by the operator at the time of installation or at the time of maintenance.

(1-2) Indoor Unit 20 (Air Conditioning Indoor Unit)

Figure 3:
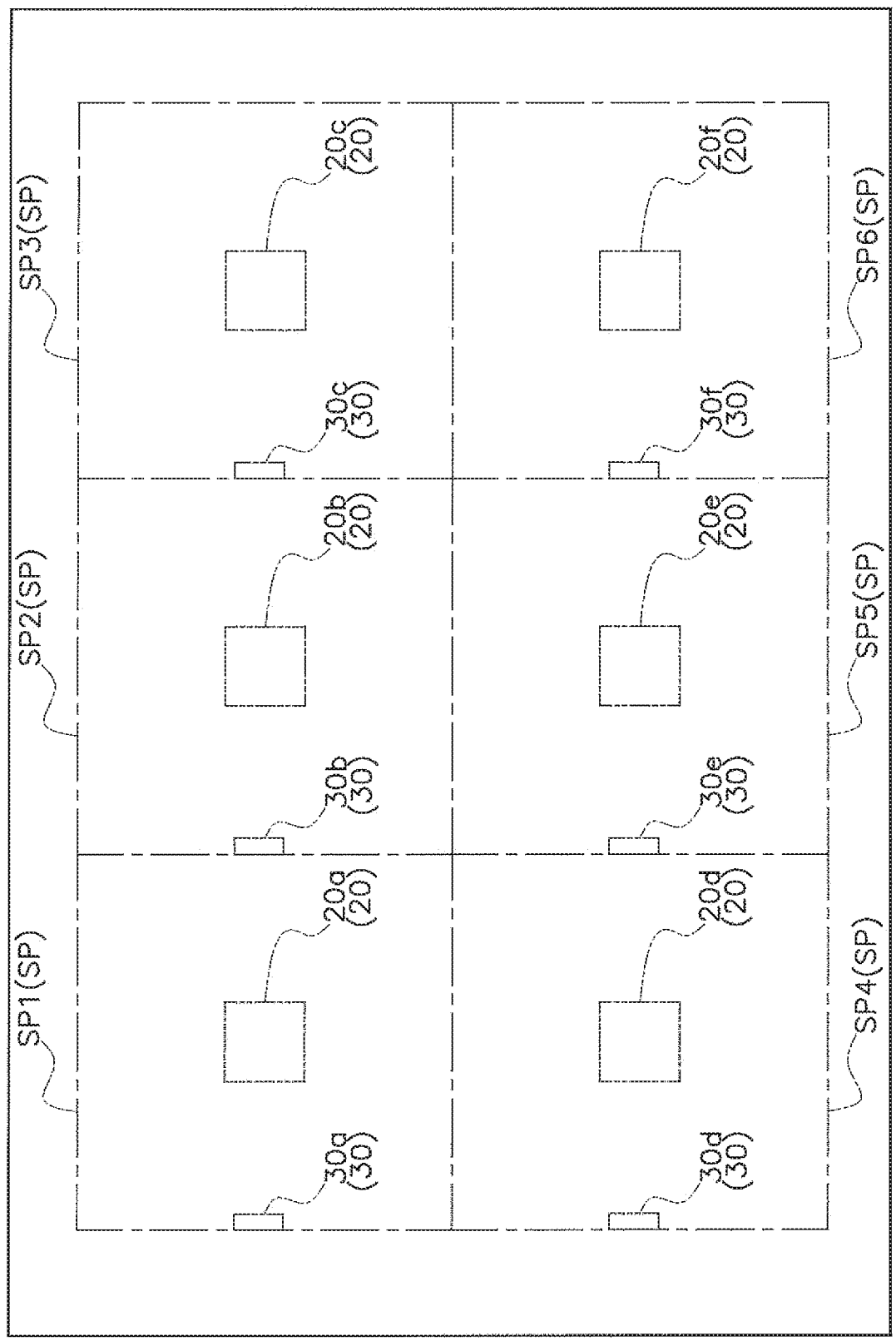
FIG. 3 is a schematic diagram schematically showing an installation mode of indoor units and the remote controllers in a facility to which the air conditioning system is applied.
Figure 4:
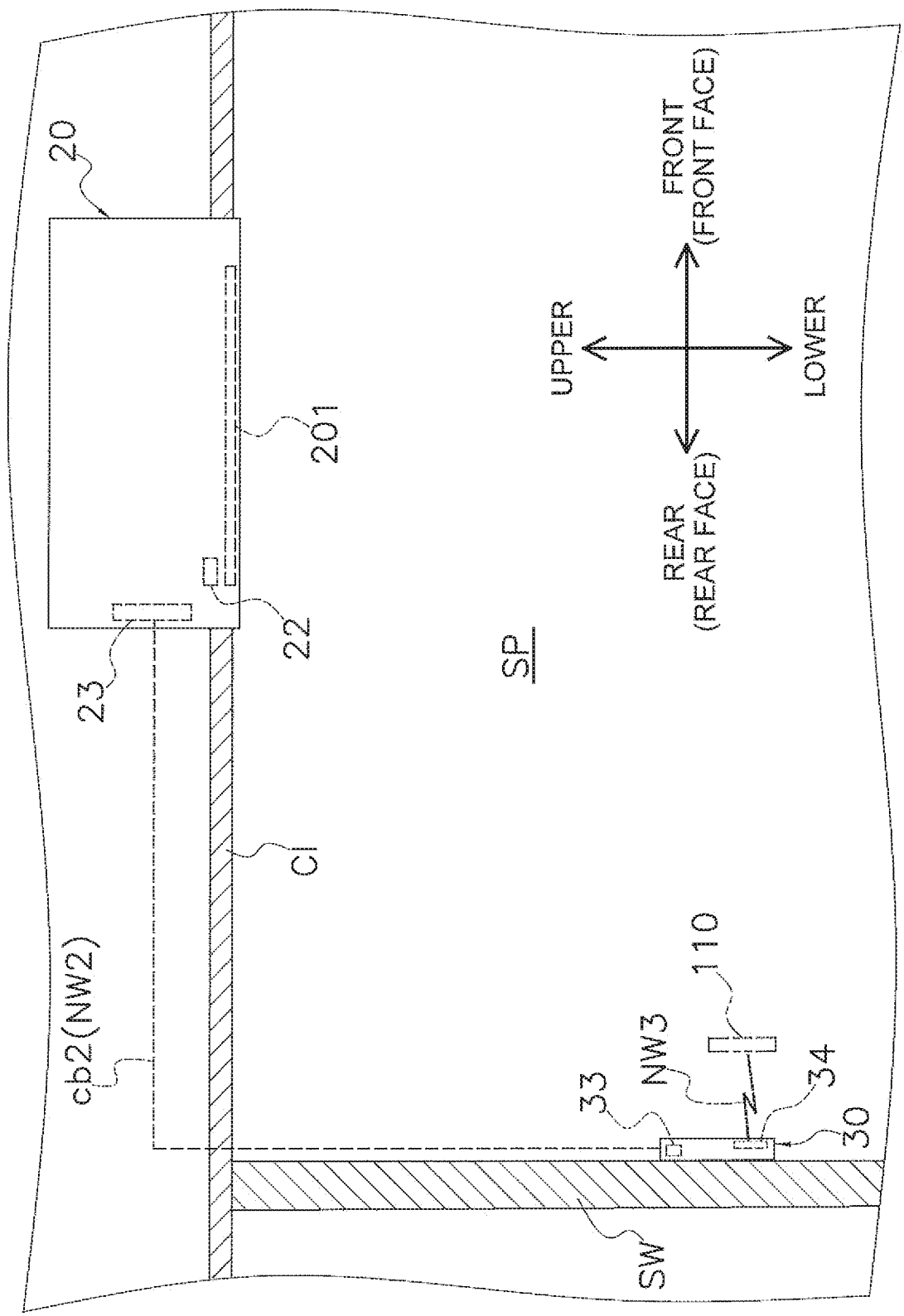
FIG. 4 is a schematic diagram schematically showing an installation mode of the indoor unit and the remote controller in a target space.

FIG. 3 is a schematic diagram schematically showing an installing mode of the indoor units 20 and the remote controllers 30 in the facility 1. FIG. 4 is a schematic diagram schematically showing an installing mode of the indoor unit 20 and the remote controller 30 in the target space SP.

In this embodiment, as the indoor units 20, a first indoor unit 20a, a second indoor unit 20b, a third indoor unit 20c, a fourth indoor unit 20d, a fifth indoor unit 20e and a sixth indoor unit 20f are installed in the target spaces SP of the facility 1. Specifically, as shown in FIG. 3, the first indoor unit 20a is installed in the target space SM. Also, the second indoor unit 20b is installed in the target space SP2, the third indoor unit 20c is installed in the target space SP3, the fourth indoor unit 20d is installed in the target space SP4, the fifth indoor unit 20e is installed in the target space SP5, and the sixth indoor unit 20f is installed in the target space SP6, individually.

In this embodiment, each of the indoor units 20 is an air conditioning indoor unit of ceiling-embedded type installed in a ceiling CI of the target space SP. Each of the indoor units 20 is so installed that, in the target space SP, an air inlet and an air outlet are exposed to the outside from the ceiling CI. Each of the indoor units 20 mainly has, as elements constituting the refrigerant circuit, a plurality of refrigerant pipes, an indoor heat exchanger, various valves such as an opening valve, a closing valve, etc. (not shown). Further, each of the indoor units 20 has an indoor fan (not shown) for generating an airflow for heat exchange with the refrigerant in the indoor heat exchanger.

Further, each of the indoor units 20 has a filter 201 for removing any grit and dust from the air entering via the air inlet. Each of the indoor units 20 also has sensors 22 for detecting predetermined values: examples of the sensors 22 including a temperature sensor for detecting a temperature of the target space SP.

Furthermore, each of the indoor units 20 includes the indoor unit control unit 23 for controlling an operation of the actuators 21 (e.g., an indoor fan and various valves. Refer to FIG. 10) in the indoor unit 20. The indoor unit control unit 23 is installed to a base plate that is disposed in the indoor unit 20. The indoor unit control unit 23 includes a CPU (hereinafter, described as indoor unit CPU 231) and a memory (hereinafter, described as "indoor unit storage unit 232") (refer to FIG. 9).

Further, the indoor unit control unit 23 includes a communication module (hereinafter, described as "indoor unit first communicating unit 233") (refer to FIG. 9) for communicating with other units (the outdoor unit 10, other indoor unit 20 or the central remote controller 40). At the indoor unit first communicating unit 233, the indoor unit control unit 23 is electrically connected, via the communication cable cb1 (first network NW1), with the outdoor unit 10 (outdoor unit control unit 13) and the other indoor unit 20 (indoor unit control units 23), thus performing a mutual transmitting-receiving of signals therebetween. Also, at the indoor unit first communicating unit 233, the indoor unit control unit 23 is connected with the wide area network 120 via the communication cable cb1, thus performing a mutual transmitting-receiving of signals with equipment (e.g., the central remote controller 40) connected to the wide area network 120.

Further, the indoor unit control unit 23 includes a communication module (hereinafter, described as "indoor unit second communicating unit 234") (refer to FIG. 9) for communicating with the corresponding remote controller 30. At the indoor unit second communicating unit 234, the indoor unit control unit 23 is electrically connected with the corresponding remote controller 30 via the communication cable cb2, thus performing a mutual transmitting-receiving of signals therebetween.

Like the outdoor unit control unit 13, the indoor unit control unit 23 is assigned a unit address used for a communication with the outdoor unit 10 (the outdoor unit control unit 13) or with the remote controller 30 (the remote controller control unit 35), and a central control address used for a communication with the central remote controller 40.

(1-3) Remote Controller 30 (Remote Control Device)

Figure 5:
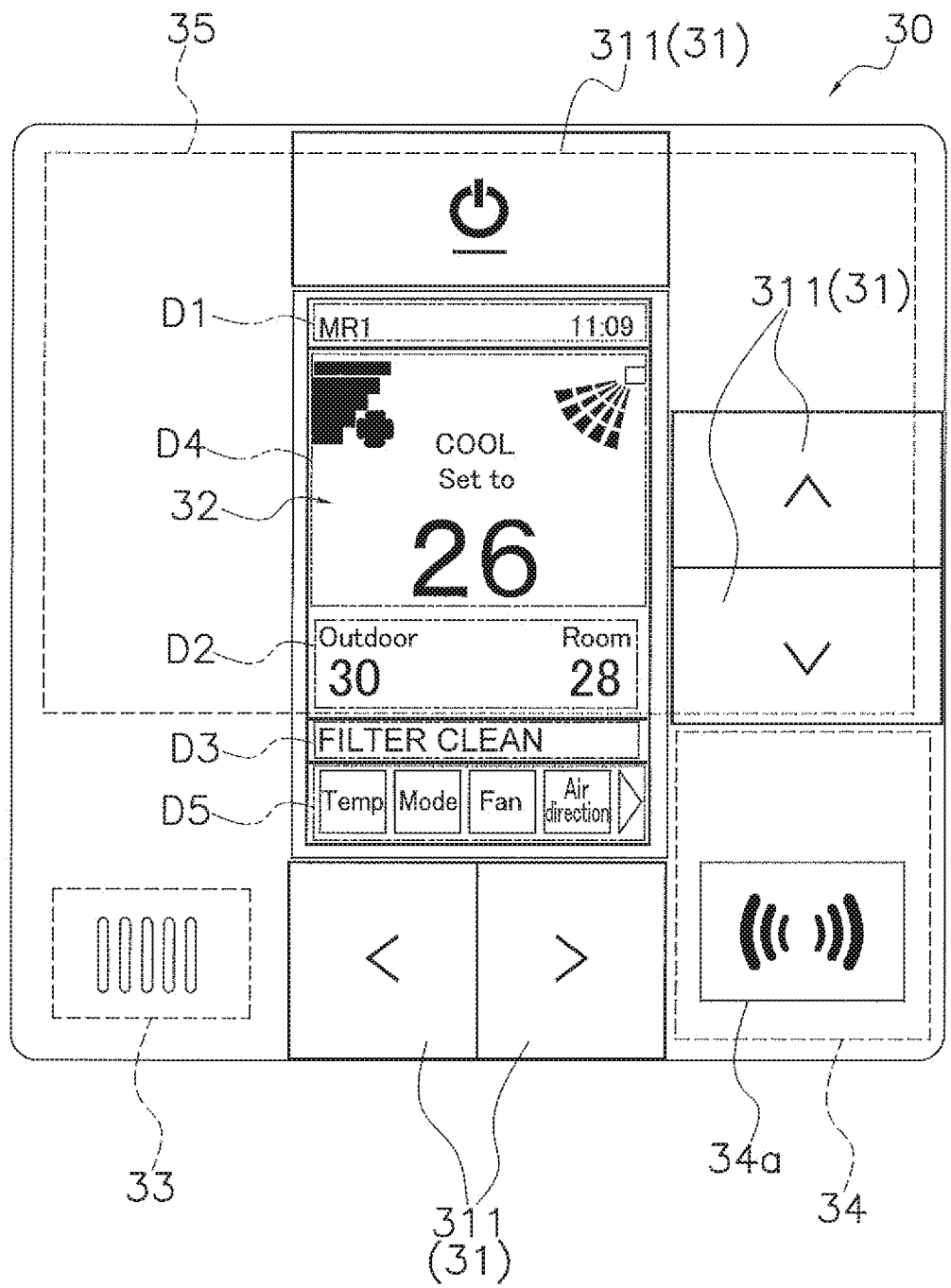
FIG. 5 is a front external view of a remote controller in a state of displaying one example of display data.
Figure 6:
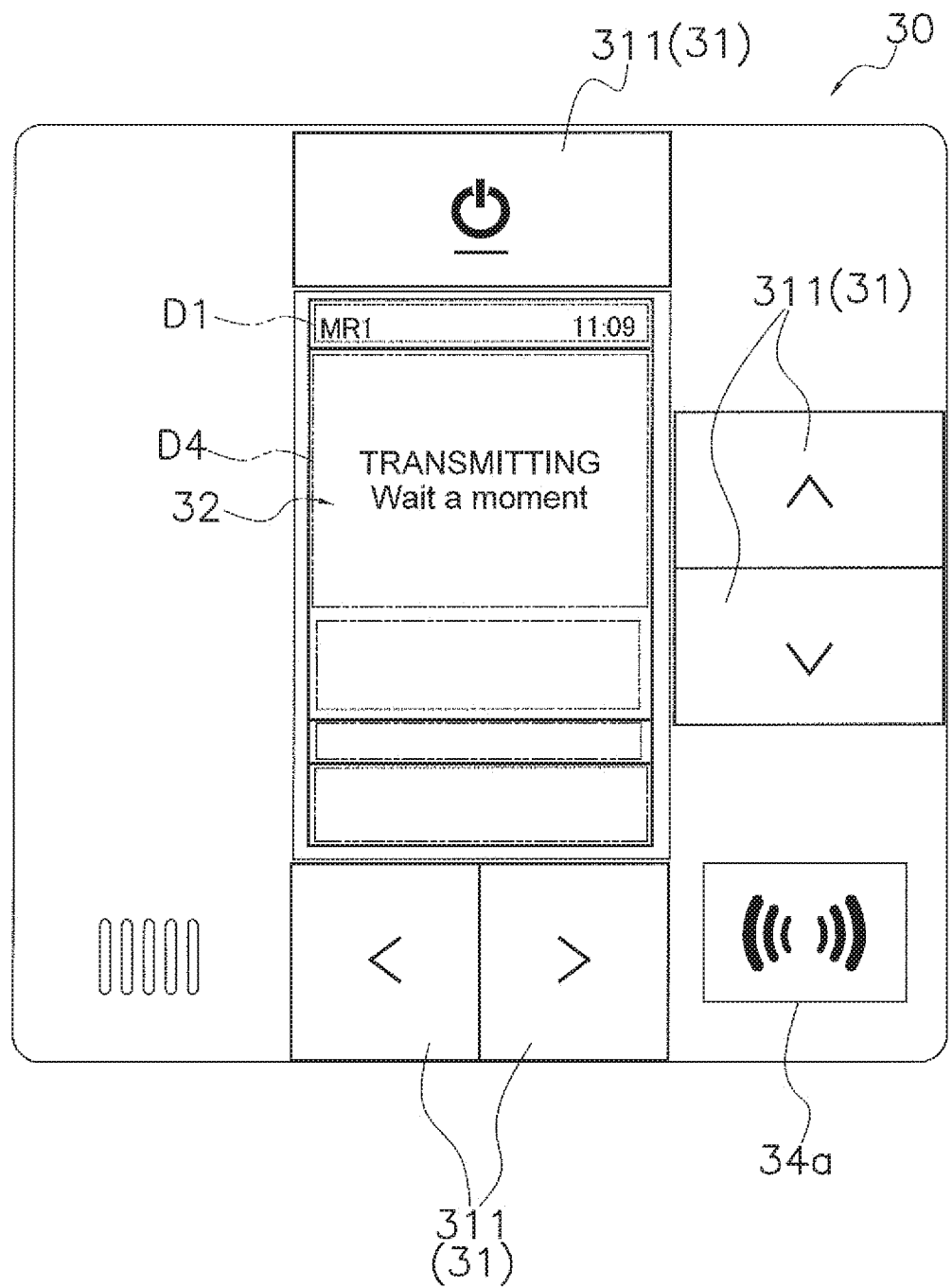
FIG. 6 is a front external view of a remote controller in a state of displaying another one example (communication state notification information) of the display data.
Figure 7:
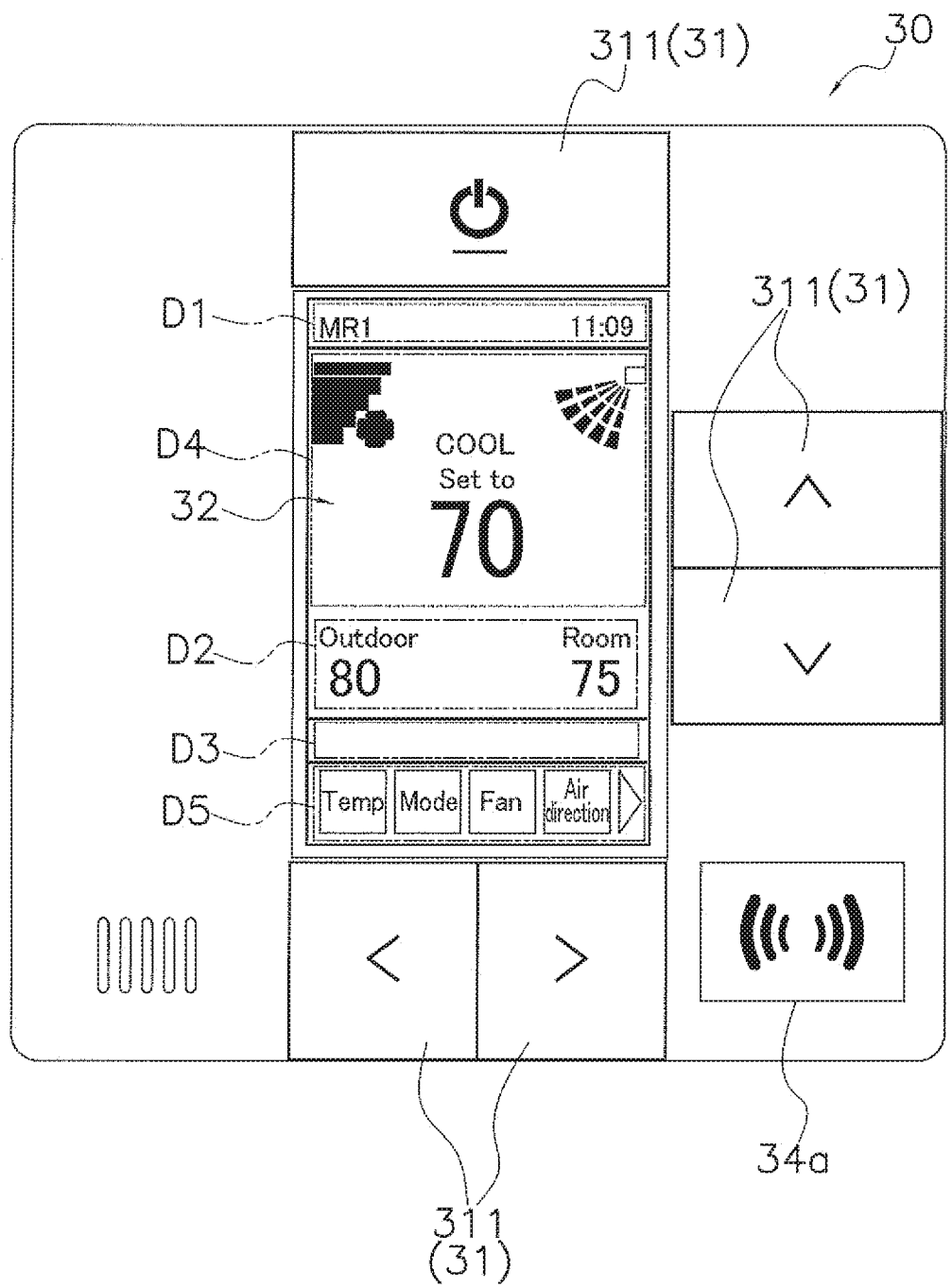
FIG. 7 is a front external view of a remote controller in a state of displaying another one example of the display data.
Figure 8:
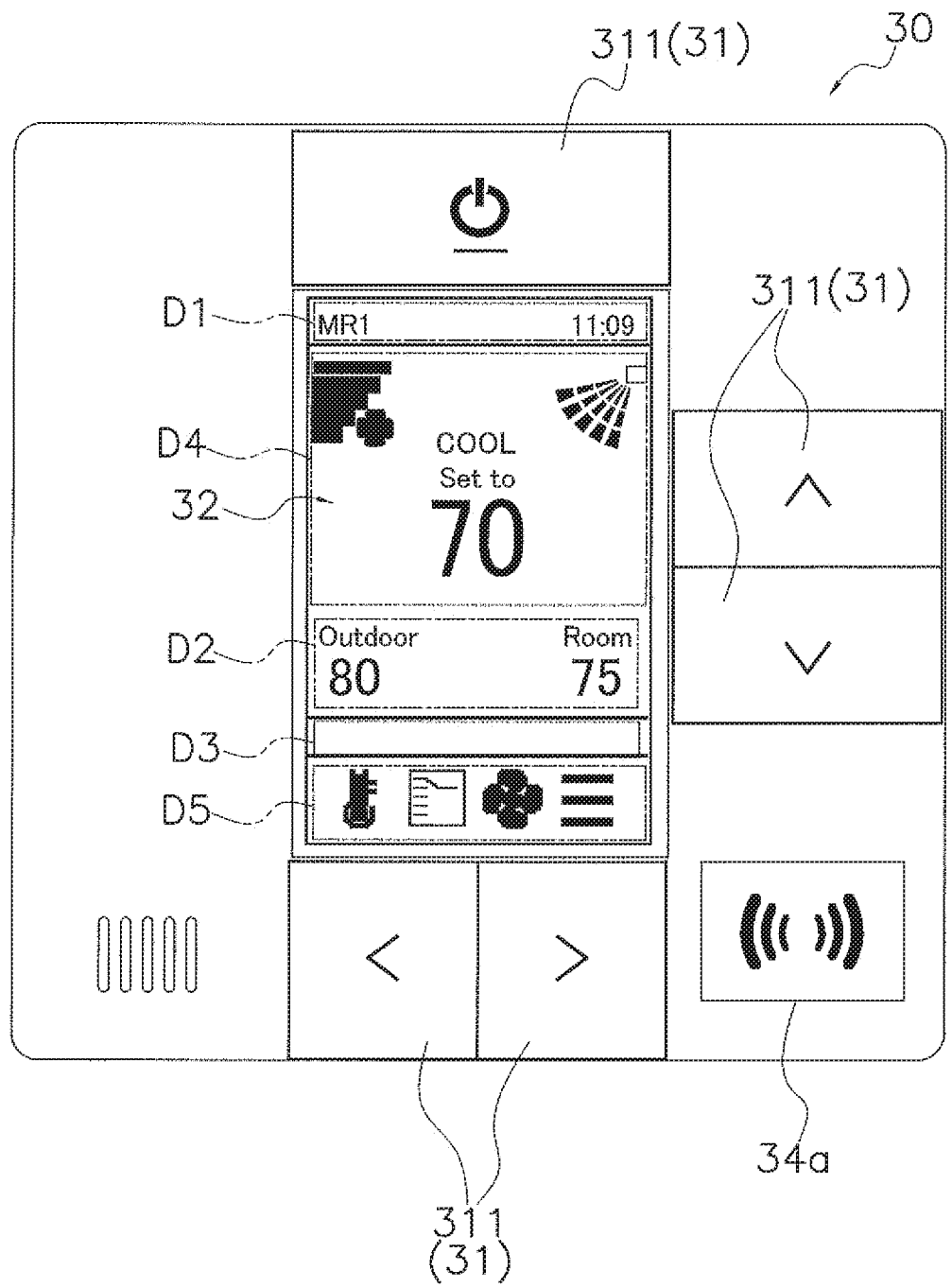
FIG. 8 is a front external view of a remote controller in a state of displaying another one example of the display data.

FIG. 5 to FIG. 8 show an external view of the remote controller 30 in a plan view (at the time of operating) an FIG. 6 to FIG. 8, no sensor 33, no short range wireless communicating unit 34, and no remote controller control unit 35 are shown.)

In this embodiment, as the remote controller 30, a first remote controller 30a, a second remote controller 30b, a third remote controller 30c, a fourth remote controller 30d, a fifth remote controller 30e, and a sixth remote controller 30f are installed in the target spaces SP of the facility 1.

The remote controller 30 corresponds to any of the indoor units 20. The remote controller 30 is installed in the same target spaces SP where the corresponding indoor unit 20 is installed. Specifically, the first remote controller 30a corresponds to the first indoor unit 20a. Likewise, the second remote controller 30b, the third remote controller 30c, the fourth remote controller 30d, the fifth remote controller 30e, and the sixth remote controller 30f respectively correspond to the second indoor unit 20b, the third indoor unit 20c, the fourth indoor unit 20d, the fifth indoor unit 20e, and the sixth indoor unit 20f. Via an attachment member, each of the remote controllers 30 is fixed to a side wall SW of the target space SP.

Each of the remote controllers 30 is what is called a wired remote control device and is electrically connected with the corresponding indoor unit 20 (the indoor unit control unit 23) via the communication cable cb2.

Each of the remote controllers 30 functions as a command input device for inputting commands for various settings to the air conditioning system 100. Each of the remote controllers 30 also functions as a display device for displaying various types of information. In addition, for input of commands via the terminal 110, each of the remote controllers 30 functions as a command receiving device for receiving the commands transmitted from the terminal 110. Furthermore, each of the remote controllers 30 functions as a data transmitting device for transmitting data to the terminal 110 as requested.

The remote controller 30 accepts input of the commands for various settings of the corresponding indoor unit 20 or of the remote controller 30 itself. The various settings performed by the commands input to the remote controller 30 include, for example: operation settings such as settings of setting temperature, operation mode, fan speed, air direction, and operation schedule; initial settings performed at the time of installation or at the time of maintenance; settings of display mode in the remote controller displaying unit 32; and settings for transmitting data from the remote controller 30 to the terminal 110.

Each of the remote controllers 30 mainly has a remote controller input unit 31 as inputting unit, a remote controller displaying unit 32 as displaying unit, the sensor 33, the short range wireless communicating unit 34, and the remote controller control unit 35 which controls operation of each unit of the remote controller 30.

In addition, each of the remote controllers 30 is electrically connected to, via a power source cable (not shown), a power source unit (not shown) included in the corresponding indoor unit 20 and is supplied with a power source from the power source unit. Note that the mode of the power supply to each of the remote controllers 30 is not necessarily limited to this and may be properly changed. For example, each of the remote controllers 30 may acquire the power supply from another power source unit (e.g., a commercial power source, etc.) via a power source cable (not shown) or may have an independent power source unit (e.g., a secondary battery, etc.).

(1-3-1) Remote Controller Input Unit 31

The remote controller input unit 31 includes a plurality of physical keys 311. The physical key 311 is a push-type button that is used to input a command by being pressed by the user. Each of the physical keys 311 is a fix key assigned a function in a fixed manner, or a function key with an assigned function that is changeable according to situations. Each of the physical keys 311 is electrically connected with the remote controller control unit 35 and, when pressed, outputs a predetermined signal to the remote controller control unit 35.

(1-3-2) Remote Controller Displaying Unit 32

The remote controller displaying unit 32 includes a full-dot matrix liquid crystal display panel and an LED backlight. Depending on a drive voltage to be supplied, the remote controller displaying unit 32 is capable of changing brightness of the backlight step by step.

The remote controller control unit 35 controls operations of the remote controller displaying unit 32. Specifically, when a predetermined drive voltage is supplied to the remote controller displaying unit 32, the remote controller displaying unit 32 lights up or blinks the backlight at a predetermined brightness, and also displays a predetermined image in a predetermined area. In addition, when the supplied drive voltage is stopped, the remote controller displaying unit 32 stops displaying.

Depending on the situations, various types of information are displayed on the remote controller displaying unit 32. For example, various types of information displayed on the remote controller displaying unit 32 include: guide information convenient for viewers such as operator, user; installation environment information about the situations of the installation environment; notification information that needs to be notified about maintenance, abnormality, etc., of the air conditioning system 100; operation information showing an operation state of the corresponding indoor unit 20; setting item information showing the configurable setting items in response to input of commands; and communication-state notification information showing that the remote controller 30 is in communication, when the remote controller 30 is performing communication via the first network NW1 or the second network NW2.

FIG. 5 shows the remote controller displaying unit 32 that is displaying the text information "MR1 (Meeting Room 1)" for specifying the target space where the corresponding indoor unit 20 is installed and the text information "11:09" for the present time is displayed as guide information (refer to the area indicated by a two dot chain line D1).

FIG. 5 also shows the remote controller displaying unit 32 that is displaying the text information "Room 28 (° C.)" for showing the temperature (room temperature) in the target space SP where the corresponding indoor unit 20 is installed, and the text information "Outdoor 30 (° C.)" for showing the outside temperature (condition of outside air temperature) is displayed as installation environment information (refer to the area indicated by a two dot chain line D2).

In addition, FIG. 5 shows the remote controller displaying unit 32 that is displaying the text information "Filter Clean" for prompting maintenance of the filter 201 of the corresponding indoor unit 20 is displayed as notification information (refer to the area indicated by a two dot chain line D3).

FIG. 5 also shows the remote controller displaying unit 32 that is displaying the diagram information showing the level of the fan speed, the diagram information showing the state of the air direction, the text information "COOL" showing the operation mode, and the text information "Set to 26 (° C.)" showing the value of the set temperature, as operation information with respect to the corresponding indoor unit 20 (refer to the area indicated by a two dot chain line D4).

FIG. 5 also shows the remote controller displaying unit 32 that is displaying information of a plurality (herein, four) of setting items. Specifically, the setting temperature ("Temp"), the operation mode ("Mode"), the setting fan speed ("Fan") and the air direction ("Air Direction") are displayed side by side in the horizontal direction, with respect to the corresponding indoor unit 20 (refer to the area indicated by a two dot chain line D5).

Furthermore, FIG. 6 shows the remote controller displaying unit 32 that is displaying the text information "Transmitting: Wait a moment" as communication-state notification information. The information shows that the remote controller 30 is in communication, when the remote controller 30 is performing communication via the first network NW1 or the second network NW2 (refer to the area indicated by the two dot chain line D4).

The display modes (e.g., display language, display size, display color, brightness, and display diagram) of various types of information displayed on the remote controller displaying unit 32 can be properly changed by setting new display data (setting a display mode) at the remote controller control unit 35. For example, English is selected as a display language in the remote controller displaying unit 32, and each text information in FIG. 5 is displayed in English in FIG. 7, and the temperature information which is displayed in centigrade in FIG. 5 is displayed in Fahrenheit in FIG. 7. Also, for example, FIG. 8 shows an example in which the information of each of setting items is displayed with a diagram (icon) (refer to the area indicated by the two dot chain line D5).

(1-3-3) Sensors 33

The sensors 33 of the remote controller 30 include a temperature sensor such as a thermistor, etc. for detecting a room temperature. The sensors 33 are electrically connected with the remote controller control unit 35 and output a signal which corresponds to a detected value, to the remote controller control units 35.

(1-3-4) Short Range Wireless Communicating Unit 34

The short range wireless communicating unit 34 is a functional unit for performing short range wireless communication with the terminal 110. Note that, the remote controller 30 has a label 34a attached thereto at a position superposed with a communication circuit 341, in the front view (at the time of installing), such that a viewer can easily grasp the position of the short range wireless communicating unit 34 incorporated in the remote controller 30. The label 34a has a mark or a text printed on it to indicate the position of the short range wireless communicating unit 34. Note that the label 34a may be properly omitted or changed.

Figure 9:
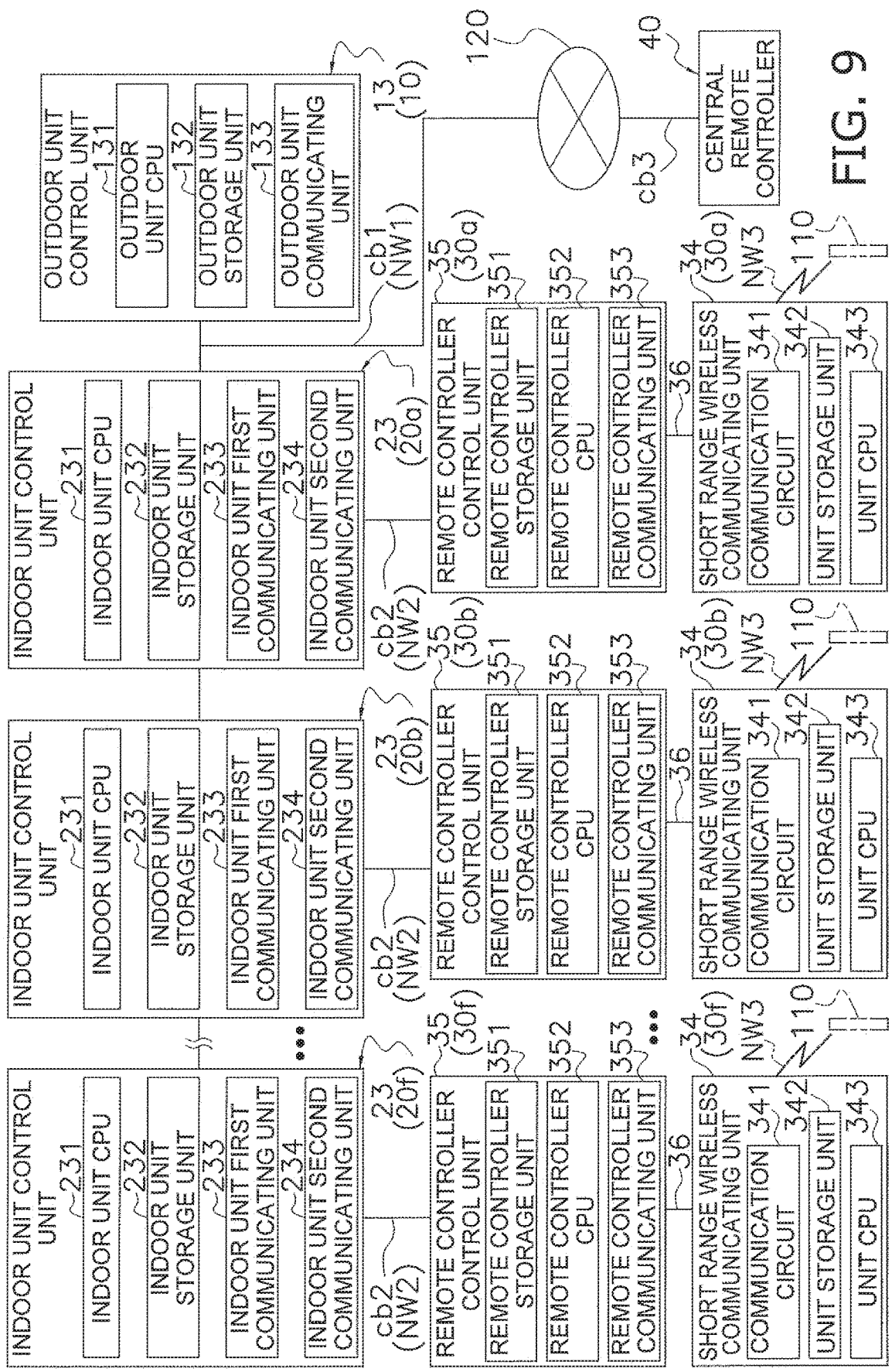
FIG. 9 is a block diagram schematically showing a communication network established in the air conditioning system, and functional units included in an outdoor unit control unit, each of indoor unit control units, each of remote controller control units and each of short range wireless communicating units.
Figure 10:
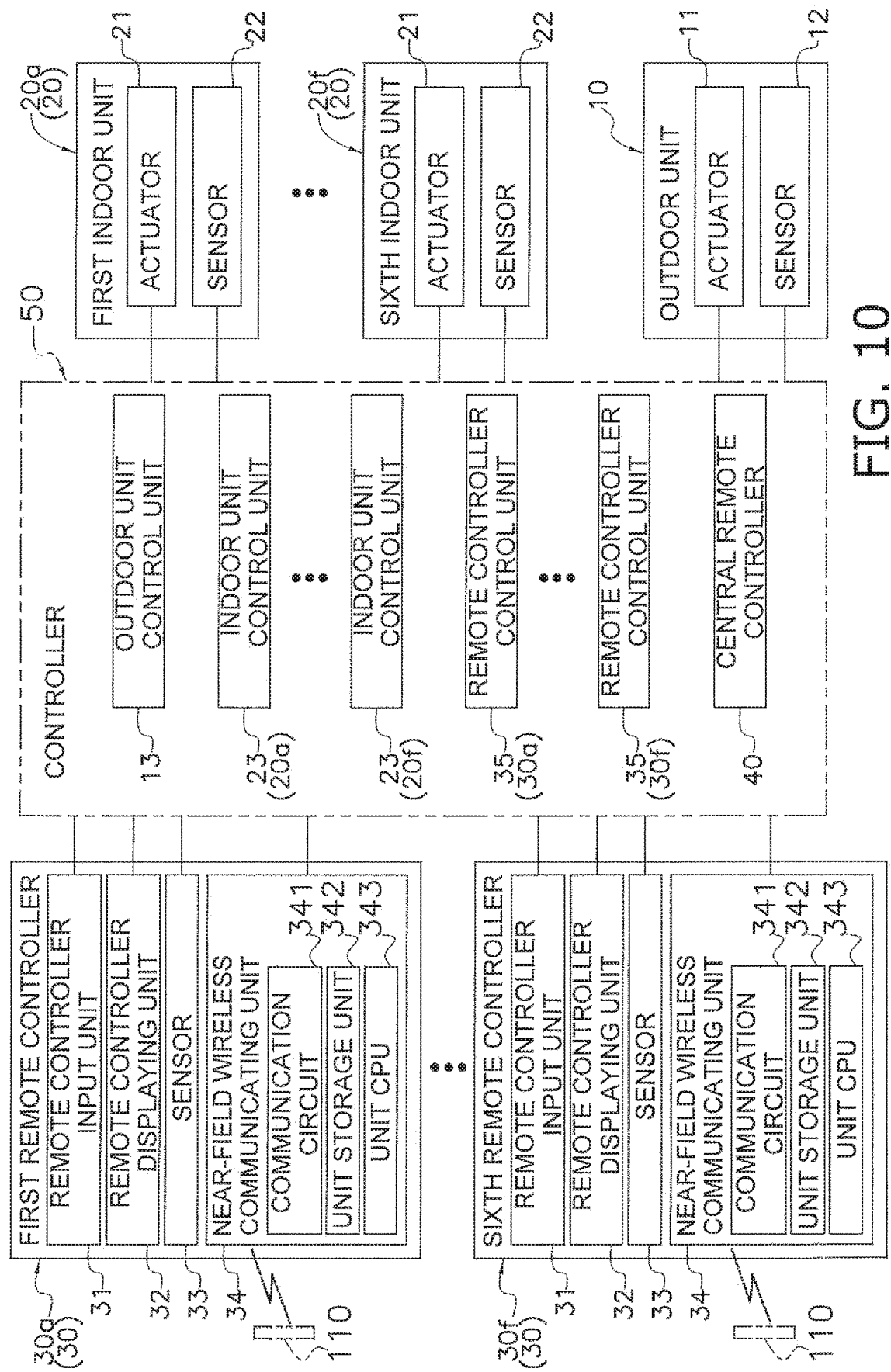
FIG. 10 is a block diagram schematically showing a controller and each of units connected to the controller.

The short range wireless communicating unit 34 includes the communication circuit 341 including an antenna or a reader/writer for the short range wireless communication with the terminal 110 (refer to FIG. 9). The short range wireless communicating unit 34 acquires a signal (command) from the terminal 110 or transmits a signal (transmission data) to the terminal 110 via the communication circuit 341.

The short range wireless communicating unit 34 further includes a memory (hereinafter, described as "unit storage unit 342") for storing the acquired signal (acquired command) or transmitted signal (transmitted data) in the communication circuit 341 (refer to FIG. 9). When the communication module 112 of the terminal 110 approaches the communication circuit 341, the communication circuit 341 causes a magnetic field, to thereby cause an induced current to the antenna in the communication module 112 of the terminal 110. This forms the third network NW3, enabling transmitting-receiving of signals by the short range wireless communication between the short range wireless communicating unit 34 and the terminal 110.

The short range wireless communicating unit 34 further includes a CPU (hereinafter, described as "unit CPU 343") for performing a predetermined process at the time of receiving a command in the communication circuit 341 or at the time of transmitting data to the terminal 110 (refer to FIG. 9).

The unit CPU 343 (corresponding to "processing unit" in the claims) has a plurality of processing modes including a first processing mode and a second processing mode. The unit CPU 343 transits to a processing mode depending on the situation and performs a predetermined process, according to a control program (not shown) stored in a program storage unit.

In the first processing mode, the unit CPU 343 performs a process (hereinafter, described as "first process") for storing an acquired command at the communication circuit 341, into the unit storage unit 342 (corresponding to "input command storage unit" in the claims).

In the second processing mode, the unit CPU 343 performs a process (hereinafter, described as "second process") for outputting an acquired command at the communication circuit 341, into the remote controller control unit 35, without storing the acquired command into the unit storage unit 342.

In a state of the unit CPU 343 that is not being supplied with a power source, upon receiving a command, the unit CPU 343 makes a transition to the first processing mode to thereby perform the first process. In a state of the unit CPU 343 that is supplied with a power source, upon receiving a command, the unit CPU 343 makes a transition to the second processing mode to thereby perform the second process.

Note that the short range wireless communicating unit 34 has a power-receiving module (not shown), and, when the terminal 110 having a power-feeding module approaches the short range wireless communicating unit 34 in a state of the short range wireless communicating unit 34 not being supplied with a power source, a wireless power feeding is made to the short range wireless communicating unit 34. That is, in a state of not being supplied with a power source, when the terminal 110 approaches the short range wireless communicating unit 34, the short range wireless communicating unit 34 allows the terminal 110 to supply a power source to the short range wireless communicating unit 34, which enables the short range wireless communicating unit 34 to perform short range wireless communication.

(1-3-5) Remote Controller Control Unit 35

The remote controller control unit 35 includes a microcomputer that is configured from a memory (a remote controller storage unit 351), a CPU (a remote controller CPU 352), etc. (refer to FIG. 9). The remote controller control unit 35 is mounted to the print circuit board that is used commonly with the short range wireless communicating unit 34 and is electrically connected with the short range wireless communicating unit 34 via a wire 36. Further, the remote controller control unit 35 is electrically connected with the sensor 33 via a wire (not shown).

The remote controller control unit 35 further includes a communication module (a remote controller communicating unit 353) for communicating with other units via the second network NW2 (refer to FIG. 9). The indoor unit control unit 23 is electrically connected to the corresponding indoor unit 20 (the indoor unit control unit 23) at the remote controller communicating unit 353 via the communication cable cb2, for performing mutual transmitting-receiving of signals.

The remote controller control unit 35 is assigned a unit address used for a communication with the outdoor unit 10 (the outdoor unit control unit 13) or with the indoor unit 20 (the indoor unit control unit 23), and a central control address used for a communication with the central remote controller 40.

(1-4) Central Remote Controller 40 (Central Remote Controller)

The central remote controller 40 is a unit for integrally controlling the operations of the air conditioning system 100. A user can properly control the operations of the outdoor unit 10, the desired indoor unit 20, or the desired remote controller 30 by inputting a command to the central remote controller 40.

The central remote controller 40 has a computer (not shown) including a CPU and, a memory; inputting means; and communication means with each of the units. The central remote controller 40 is disposed, for example, in a location away from the target spaces SP. The central remote controller 40 is connected to the wide area network 120 via the communication cable cb3. The central remote controller 40 performs a communication by using the central control address, via the wide area network 120, with the outdoor unit 10 (the outdoor unit control unit 13), each of the indoor units 20 (the indoor unit control units 23) and each of the remote controllers 30 (the remote controller control units 35).

(2) NETWORK ESTABLISHED IN AIR CONDITIONING SYSTEM 100

FIG. 9 is a block diagram schematically showing a communication network established in the air conditioning system 100, and functional units included in the outdoor unit control unit 13, each of the indoor unit control units 23, each of the remote controller control units 35 and each of the short range wireless communicating units 34.

In the air conditioning system 100, the first network NW1 functioning as a transmission path between the outdoor unit (the outdoor unit control unit 13) and each of the indoor units 20 (the indoor unit control units 23) is established. Also, in the air conditioning system 100, a plurality of second networks NW2 each functioning as a transmission path between the remote controller 30 (the remote controller control units 35) and the corresponding indoor unit 20 (the indoor unit control unit 23) is established. In addition, in the air conditioning system 100, a plurality of third networks NW3 each functioning as a transmission path between each of the remote controllers 30 (the remote controller control units 35) and the terminal 110 are established.

The first network NW1 is established when the outdoor unit control unit 13 (the outdoor unit communicating unit 133) is connected to the indoor unit control unit 23 (the indoor unit first communicating unit 233) of the one indoor unit 20 (herein, the first indoor unit 20a) via the communication cable cb1 and the indoor unit control unit 23 (the indoor unit first communicating unit 233) of each of the indoor units 20 is connected with the indoor unit control unit 23 (the indoor unit first communicating unit 233) of another indoor unit 20 via the communication cable cb1. In addition, the first network NW1 is connected with the central remote controller 40 via the wide area network 120, and thereby also functions as a signal-transmission path between the outdoor unit control unit 13 and the central remote controller 40 and between each of the indoor units 20 (the indoor unit control units 23) and the central remote controller 40.

The second network NW2 is established when the remote controller communicating unit 353 of each of the remote controllers 30 is connected with the indoor unit second communicating unit 234 of the corresponding indoor unit 20 via the communication cable cb2.

The third network NW3 is established when the short range wireless communicating unit 34 (the communication circuit 341) of each of the remote controllers 30 approaches the communication module 112 of the terminal 110.

(3) CONTROLLER 50

Figure 11:
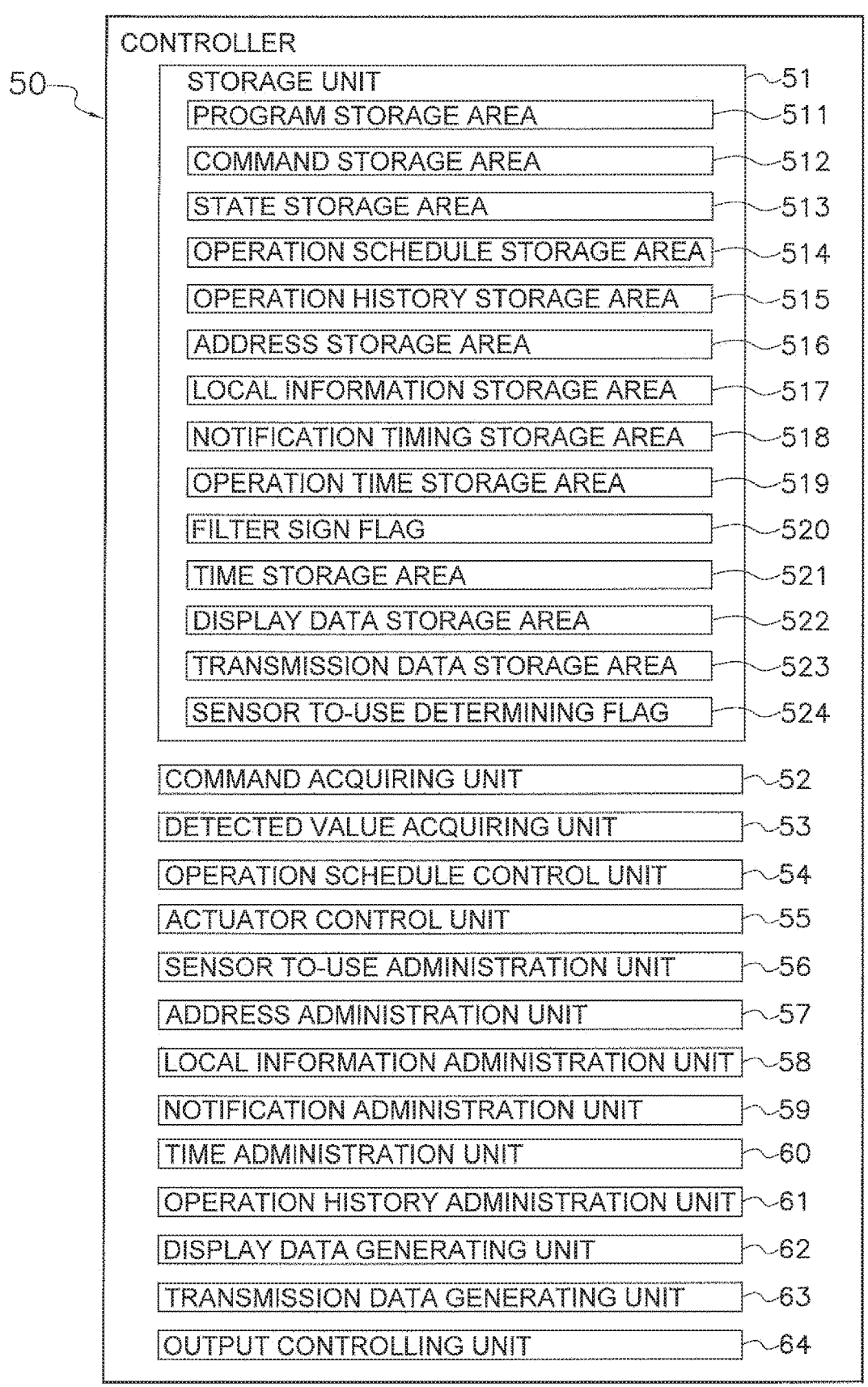
FIG. 11 is a block diagram schematically showing each of the functional units included in the controller.

FIG. 10 is a block diagram schematically showing the controller 50 and each of the units connected to the controller 50. FIG. 11 is a block diagram schematically showing each of the functional units included in the controller 50.

The controller 50 is a computer configured when the outdoor unit control unit 13, the indoor unit control unit 23 of each of the indoor units 20, the remote controller control unit 35 of each of the remote controllers 30, and the central remote controller 40 are connected via the networks (NW1, NW2, 120).

The controller 50 is electrically connected with the actuator 11 and various sensors 12 in the outdoor unit 10; the actuator 21 and the sensor 22 in each of the indoor units 20; and the remote controller input unit 31, the remote controller displaying unit 32, the sensor 33 and the short range wireless communicating unit 34 in each of the remote controllers 30, via an interface (not shown).

The controller 50 mainly includes functional units such as a storage unit 51, a command acquiring unit 52, a detected value acquiring unit 53, an operation schedule control unit 54, an actuator control unit 55, a sensor to-use administration unit 56, an address administration unit 57, a local information administration unit 58, a notification administration unit 59, a time administration unit 60, an operation history administration unit 61, a display data generating unit 62, a transmission data generating unit 63, and an output control unit 64.

(3-1) Storage Unit 51

The storage unit 51 is configured from memories such as ROM, RAM, flash memory, etc. included in the outdoor unit control unit 13, each of the indoor unit control units 23, each of the remote controller control units 35, and the central remote controller 40. The storage unit 51 includes a plurality of storage areas, and, in each of the storage areas, stores predetermined information. Specifically, the storage unit 51 has a program storage area 511, a command storage area 512, a state storage area 513, an operation schedule storage area 514, an operation history storage area 515, an address storage area 516, a local information storage area 517, a notification timing storage area 518, an operation time storage area 519, a filter sign flag 520, a time storage area 521, a display data storage area 522, a transmission data storage area 523, and a sensor to-use determining flag 524.

The program storage area 511 stores control programs defining various processes to be performed in each unit of the remote controller control unit 35. The control program can be properly updated.

The command storage area 512 stores the commands that have been input in the remote controller 30. For example, the command storage area 512 stores the commands that have been input via the remote controller input unit 31. The command storage area 512 also stores the commands acquired at the short range wireless communicating unit 34. The state storage area 513 stores the information of the operation state (e.g., the operation mode, the setting temperature, the fan speed, and the air direction of each of the indoor units 20) of the air conditioning system 100. The state storage area 513 also stores the information of the detected values obtained by each of the sensors (12, 22, 33).

The operation schedule storage area 514 stores an operation schedule table TB1 (refer to FIG. 12) for identifying an operation schedule (e.g., the operation date and time of each of the indoor units 20) of the air conditioning system 100. The operation schedule table TB1 is generated or updated by the operation schedule control unit 54.

The operation history storage area 515 stores the information (operation history information) of the operation history (past operation states) of the air conditioning system 100. The operation history information is the information that can be used to individually specify a past operation state (e.g., start-stop state, operation mode, setting temperature, air direction, rotation speed of compressor, opening degree of expansion valve, superheating level of refrigerant, and subcooling level of refrigerant, each of these operation states being obtained per a certain period) of each units of the air conditioning system 100 (especially, each of the indoor units 20). The operation history information is generated by the operation history administration unit 61.

The address storage area 516 stores an address table TB2 (refer to FIG. 13) for identifying a communication address (the unit address and the central control address) assigned to each of the units included in the air conditioning system 100. The address table TB2 is generated or updated by the address administration unit 57.

The local information storage area 517 stores a local information table TB3 (refer to FIG. 14) for specifying the local information of the installation place (the target space SP) of each of the indoor units 20. The local information table TB3 is generated or updated by the local information administration unit 58.

The notification timing storage area 518 stores the information (notification timing information) for specifying the timing for displaying, as notification information, the text information (Filter Clean) for prompting a maintenance of the filter 201 on the remote controller displaying unit 32 of each of the remote controllers 30. The notification timing information is generated or updated by the notification administration unit 59. In this embodiment, the notification timing information is so defined that the "Filter Clean" is displayed as the notification information in the corresponding remote controller displaying unit 32 per elapse of a predetermined time (e.g., 1000 hours) of the operation time of the indoor unit 20.

The operation time storage area 519 stores the information (operation time specifying information) for specifying the operation time for each indoor unit 20.

The filter sign flag 520 is a flag for determining whether or not the text information "Filter Clean" for prompting the maintenance of the filter 201 in the remote controller displaying unit 32 of the specific remote controller 30 should be displayed as notification information. The filter sign flag 520 includes the number of bits corresponding to the number of sets of the corresponding indoor unit 20 and remote controller 30 and has the notification administration unit 59 set or clear the corresponding bit.

The time storage area 521 stores the information (time information) for specifying the present time. The time information is generated or updated by the time administration unit 60.

The display data storage area 522 stores the display data generated by the display data generating unit 62.

The transmission data storage area 523 stores the transmission data generated by the transmission data generating unit 63. Note that the transmission data storage area 523 is provided in the remote controller storage unit 351 of each of the remote controller control units 35. That is, in the air conditioning system 100, the remote controller storage unit 351 of each of the remote controllers 30 corresponds to the "transmission data storage unit" in the claims.

The sensor to-use determining flag 524 is a flag for determining, in each of the corresponding sets of the indoor unit 20 and remote controller 30, a detection value of which sensor, i.e., the sensor 22 and the sensor 33, is to be used concerning the room temperature displayed on the remote controller displaying unit 32. The sensor to-use determining flag 524 includes the number of bits corresponding to the number of sets of the corresponding indoor unit 20 and remote controller 30, and the sensor to-use administration unit 56 sets or clears the corresponding bit.

(3-2) Command Acquiring Unit 52

The command acquiring unit 52 is a functional unit for acquiring the reception command acquired at the short range wireless communicating unit 34 by the short range wireless communication. Upon output of a reception command from the short range wireless communicating unit 34, the command acquiring unit 52 acquires the reception command to thereby store the reception command in the command storage area 512. Also, when a new reception command is stored in the unit storage unit 342 of the short range wireless communicating unit 34, the command acquiring unit 52 acquires the new reception command to thereby store the new reception command in the command storage area 512.

(3-3) Detected Value Acquiring Unit 53

Upon output of a detection value from each of the sensors (12, 22, 23), the detected value acquiring unit 53 acquires the detection value to thereby store the detection value in the state storage area 513.

(3-4) Operation Schedule Control Unit 54

When a new command for the operation schedule (schedule setting command) is stored in the command storage area 512, the operation schedule control unit 54, based on the command, generates or updates the operation schedule table TB1. The operation schedule control unit 54 stores the generated or updated operation schedule table TB1 in the operation schedule storage area 514.

FIG. 12 is a schematic diagram showing one example of the operation schedule table TB1. In the operation schedule table TB1, the operation schedule of each of the indoor units 20 is registered. In this embodiment, the information for specifying the start-stop state and/or the operation type with respect to each of the indoor units 20 is registered as an operation schedule, in the rows for defining the operation state in each of the time zones.

The operation schedule table TB1 shown in FIG. 12 shows a condition where the information ("Stop") for specifying the start-stop state of the first indoor unit 20*a* to the fifth indoor unit 20*e* is registered and the information ("COOLING OPERATION") for specifying the start-stop state of and the operation type of the sixth indoor unit 20*f* is registered in each row for defining each of the operation states from 22:00 to 7:00, so that the first indoor unit 20*a* to the fifth indoor unit 20*e* stop and also the sixth indoor unit 20*f* performs an air cooling operation during the time period from 22:00 to 8:00.

The operation schedule table TB1 shown in FIG. 12 also shows a condition where the information ("COOLING OPERATION") for specifying the start-stop state of and the operation type of the first indoor unit 20*a* to the sixth indoor unit 20*f* is registered in each row for defining each of the operation states from 8:00 to 21:00, so that the first indoor unit 20*a* to the sixth indoor unit 20*f* perform an air cooling operation during the time period from 8:00 to 22:00.

(3-5) Actuator Control Unit 55

Based on various types of information (e.g., the command stored in the command storage area 512, the information stored in the state storage area 513, the operation schedule table TB1 stored in the operation schedule storage area 514, and/or the local information stored in the local information storage area 517, etc.) stored in the storage unit 51, the actuator control unit 55 transmits a signal to the various actuators (11, 21) depending on situations to thereby control the operation.

(3-6) Sensor to-Use Administration Unit 56

Based on a predetermined command (a sensor to-use selecting command) stored in the command storage area 512, the sensor to-use administration unit 56 sets or clears the corresponding hit in the sensor to-use determining flag 524.

(3-7) Address Administration Unit 57

The address administration unit 57 generates or updates the address table TB2, based on a predetermined command (a sensor to-use selecting command) stored in the command storage area 512. The address administration unit 57 stores the generated address table TB2 in the address storage area 516.

FIG. 13 is a schematic diagram showing one example of the address table TB2. The address table TB2 registers: the information for specifying the unit address assigned to each of the units (the outdoor unit 10, each of the indoor units 20, each of the remote controllers 30, and central remote controller 40) included in the air conditioning system 100; the information for specifying the central control address; and the information (unit identifying information) for identifying each of the units uniquely.

In the address table TB2 shown in FIG. 13, the value of a variable "unit address" for specifying the unit address, the value of a variable "central control address" for specifying the central control address, and the value of a variable "identification information" for specifying the unit identification information are registered in each of the rows for defining the respective units. For example, the address table TB2 shown in FIG. 13 shows a condition where, in the row for defining the first remote controller 30*a*, "121" is registered as the value of the variable "unit address," "1021" is registered as the value of the variable "central control address" and "C1" is registered as the value of the variable "identification information" so as to specify that the unit address assigned to the first remote controller 30*a* is "121," the central control address is "1021" and the unit identification information is "C1."

(3-8) Local Information Administration Unit 58

The local information administration unit 58 generates or updates the local information table TB3, based on a predetermined command (a local information setting command) stored in the command storage area 512. The local information administration unit 58 stores the generated local information table TB3 in the local information storage area 517. The local information table TB3 is information of the installation place of each of the indoor units 20 (local information), and is used to specify, for example, the ceiling height, largeness, existing floor, or identification name of the target space SP.

FIG. 14 is a schematic diagram showing one example of the local information table TB3. In each of the rows for defining the respective indoor units 20 of the local information table TB3, the information for specifying the installation place, the identification name, the ceiling height, the largeness, the existing floor of the installation place are registered. For example, the local information table TB3 shown in FIG. 14 shows a condition where the information "SP1" for specifying the installation place, the identification name of the installation place "MR1 (Meeting Room 1)," the ceiling height of the installation place "2.7 m," the largeness of the installation place "56 $m^2$," and the existing floor of the installation place "11F," etc. are registered, in the row for defining the local information of the first indoor unit 20a.

(3-9) Notification Administration Unit 59

The notification administration unit 59 generates and updates the notification timing information based on a predetermined command (a filter sign notification setting command) stored in the command storage area 512 and stores the notification timing information in the notification timing storage area 518.

The notification administration unit 59 also includes a counter for counting the operation time of each of the indoor units 20, and properly updates the operation time specifying information that has been stored in the operation time storage area 519.

Furthermore, with respect to the respective indoor units 20, in a case where the operation time, after the construction or after the maintenance, goes beyond the time specified by the notification timing information stored in the notification timing storage area 518, the notification administration unit 59 sets a corresponding bit of the filter sign flag 520. Note that the case where, with respect to the respective indoor units 20, the operation time, after the construction or after the maintenance, goes beyond the time specified by the notification timing information stored in the notification timing storage area 518 corresponds to a case in which it is assumed that the time for maintenance for the filter 201 of the above indoor unit 20 has come.

(3-10) Time Administration Unit 60

The time administration unit 60 is a functional unit including a counter for counting time. When a new command (a time setting command) for setting time is stored in the command storage area 512, the time administration unit 60 generates time information based on the command and stores the time information in the time storage area 521. The time administration unit 60 continuously counts time, and, based on the counted time, properly updates the time information stored in the time storage area 521.

(3-11) Operation History Administration Unit 61

The operation history administration unit 61 generates the operation history information according to situations, based on various types of information stored in the storage unit 51 (e.g., the commands stored in the command storage area 512, various types of information stored in the state storage area 513, the operation schedule table TB1 stored in the operation schedule storage area 514, and/or the time information stored in the time storage area 521). The operation history administration unit 61 stores the generated operation history information in the operation history storage area 515.

(3-12) Display Data Generating Unit 62

The display data generating unit 62 generates, according to situations, data (display data) for the information to be displayed on the remote controller displaying unit 32 of each of the remote controllers 30, based on various types of information stored in the storage unit 51 (e.g., the commands stored in the command storage area 512, the information stored in the state storage area 513, the operation schedule table TB1 stored in the operation schedule storage area 514, the operation history information stored in the operation history storage area 515, the local information table TB3 stored in the local information storage area 517, the operation time specifying information stored in the operation time storage area 519, the state of the filter sign flag 520, and/or the time information stored in the time storage area 521). The display data generating unit 62 stores the generated display data in the display data storage area 522.

For example, when one of the bits of the filter sign flag 520 is set, the display data generating unit 62 generates predetermined display data so that the text information "Filter Clean" (refer to FIG. 5) is displayed as notification information on the corresponding remote controller displaying unit 32, for prompting the maintenance of the filter 201 of the indoor unit 20 which corresponds to the above bit.

Also, for example, when the time information stored in the time storage area 521 is updated, the display data generating unit 62 generates predetermined display data so that the above time information is displayed, as guide information, on the remote controller displaying unit 32 of each of the remote controllers 30.

Furthermore, for example, when the corresponding remote controller 30 is in communication via the first network NW1 or the second network NW2, the display data generating unit 62 generates predetermined data so that the communication state notification information (refer to FIG. 6) is displayed on the remote controller displaying unit 32 of the above remote controller 30.

(3-13) Transmission Data Generating Unit 63

When a new command requesting for data transmission (data transmission requesting command) is stored in the command storage area 512, the transmission data generating unit 63 generates data (transmission data) requested in the command. The transmission data generating unit 63 generates the transmission data, along with various types of information (e.g., the command stored in the command storage area 512, various types of information stored in the state storage area 513, the operation schedule table TB1 stored in the operation schedule storage area 514, the operation history information stored in the operation history storage area 515, the local information table TB3 stored in the local information storage area 517 and/or the operation time specifying information stored in the operation time storage area 519) stored in the storage unit 51. The transmission data generating unit 63 stores the generated transmission data in the transmission data storage area 523.

Furthermore, when no new data transmission requesting command is stored in the command storage area 512, the transmission data generating unit 63 also periodically (e.g., every week) generates various data which may be requested in the command and stores the various data in the transmission data storage area 523. With this configuration, when a user inputs a data transmission requesting command, the time for generating and transmitting of the data can be decreased.

(3-14) Output Control Unit 64

The output control unit 64 outputs predetermined data to each of the units according to situations. For example, when new display data is stored in the display data storage area. 522, the output control unit 64 outputs a corresponding drive signal to the remote controller 30 (the remote controller displaying unit 32) so that the display data will be displayed on the corresponding remote controller 30.

Also, when new transmission data is stored in the transmission data storage area 523, the output control unit 64 outputs the transmission data to the corresponding short range wireless communicating unit 34 so that the above transmission data is transmitted to the terminal 110 which is the transmission source of the data transmission requesting command.

Note that, as stated above, in this embodiment, the transmission data storage area 523 is provided in the remote controller storage unit 351 of each of the remote controller control units 35, and therefore, when a user inputs a data transmission requesting command, and the desired transmission data is already present in the remote controller storage unit 351, the time (transmission time) for acquiring the transmission data can be decreased.

(4) COMMANDS INPUT TO AIR CONDITIONING SYSTEM 100

In the air conditioning system 100, an operator inputs commands for various settings. The operator inputs the command by inputting a desired command to the remote controller input unit 31 of the remote controller 30, or by transmitting the command input to the terminal 110, from the terminal 110 to the communication circuit 341 of the remote controller 30.

Specifically, the following input commands for example are input the air conditioning system 100: an operation state switching command, a local information registration setting command, a schedule setting command, a central address setting command, a time setting command, the sensor to-use selecting command, the filter sign notification setting command, a display mode setting command, and the data transmission requesting command. Note that, among these various commands, the local information registration setting command, the schedule setting command, the central address setting command, the time setting command, the sensor to-use selecting command, the filter sign notification setting command, and the display mode setting command are mainly input at the time of performing of the initial setting (they, however, may be input in cases other than the initial setting), and therefore these commands correspond to the "initial setting command" described in the claim.

The operation state switching command is a command for switching of various setting items for switching the operation state of the air conditioning system 100 (especially, the outdoor unit 10 and the indoor unit 20). For example, the operation state switching command is a command for switching the setting items such as operation mode, setting temperature, fan speed, air direction, and timer setting of each of the indoor units 20.

The local information registration setting command is a command for registering (generating or updating of the local information table TB3) of local information of the installation place of each of the indoor units 20.

The schedule setting command is a command for setting the operation schedule of the air conditioning system 100 (that is, setting of the operation schedule table TB1).

The central address setting command is a command for setting of the central control address of each of the units of the air conditioning system 100 (that is, setting of the address table TB2). Specifically, the central address setting command is a command for increasing/decreasing the number of central control addresses of a specific unit, per input thereof for example. The central address setting command is also a command for collectively setting the central control addresses of a plurality of specific units, per input thereof for example.

The time setting command is a command for setting of the time displayed as guide information in each of the remote controllers 30 (that is, setting of the time information held by the air conditioning system 100).

The sensor to-use selecting command is a command for setting, in the corresponding indoor unit 20 and remote controller 30, a detection value of which sensor, i.e., the sensor 22 incorporated in the indoor unit 20 and the sensor 33 incorporated in the remote controller 30, is to be used concerning the room temperature displayed in the remote controller 30 (a command for switch setting of the sensor to-use determining flag 524).

The filter sign notification setting command is a command for setting the timing for displaying, as notification information, the text information "Filter Clean" for prompting the maintenance of the filter 201 in each of the remote controllers 30 (that is, setting of the notification timing information stored in the notification timing storage area 518).

The display mode setting command is a command for setting of the display mode of the remote controller displaying unit 32 of each of the remote controllers 30.

The data transmission requesting command is a command for setting of the data transmission for transmitting the information held by the air conditioning system 100 from the remote controller 30 to the terminal 110 (a command for requesting the air conditioning system 100 for a transmission of data to the terminal 110).

The data transmission requesting command is input at the time of requesting the air conditioning system 100 for a transmission of data for, for example, the operation history information for specifying the operation state, failure timing, etc. of the indoor unit 20, the information for specifying the operation state of the actuator (rotation speed of the compressor or of the fan, or opening degrees of various valves) at a predetermined time, the information for specifying the detected value of various sensors (12, 22, 33) at a predetermined time, the information for specifying the setting states for various settings at a predetermined time, the information on power consumption, or the information for specifying the setting states for various settings.

The data transmitted from the remote controller 30 to the terminal 110 in response to input of the data transmission requesting command includes the specifying data. The specifying data is information capable of specifying the difference in setting items between the state before a switching and the state after the switching, the items having setting content that has been switched based on respective commands. For example, the specifying data is used for determining the cause of a failure, through an analysis about the difference that is performed by a serviceman at the time of maintenance. Alternatively, for example, the specifying data is used for various operations, through collection and analysis of the specifying data per facility or per target space by an administrator.

(5) PROCESS FLOW IN AIR CONDITIONING SYSTEM 100

Figure 15:
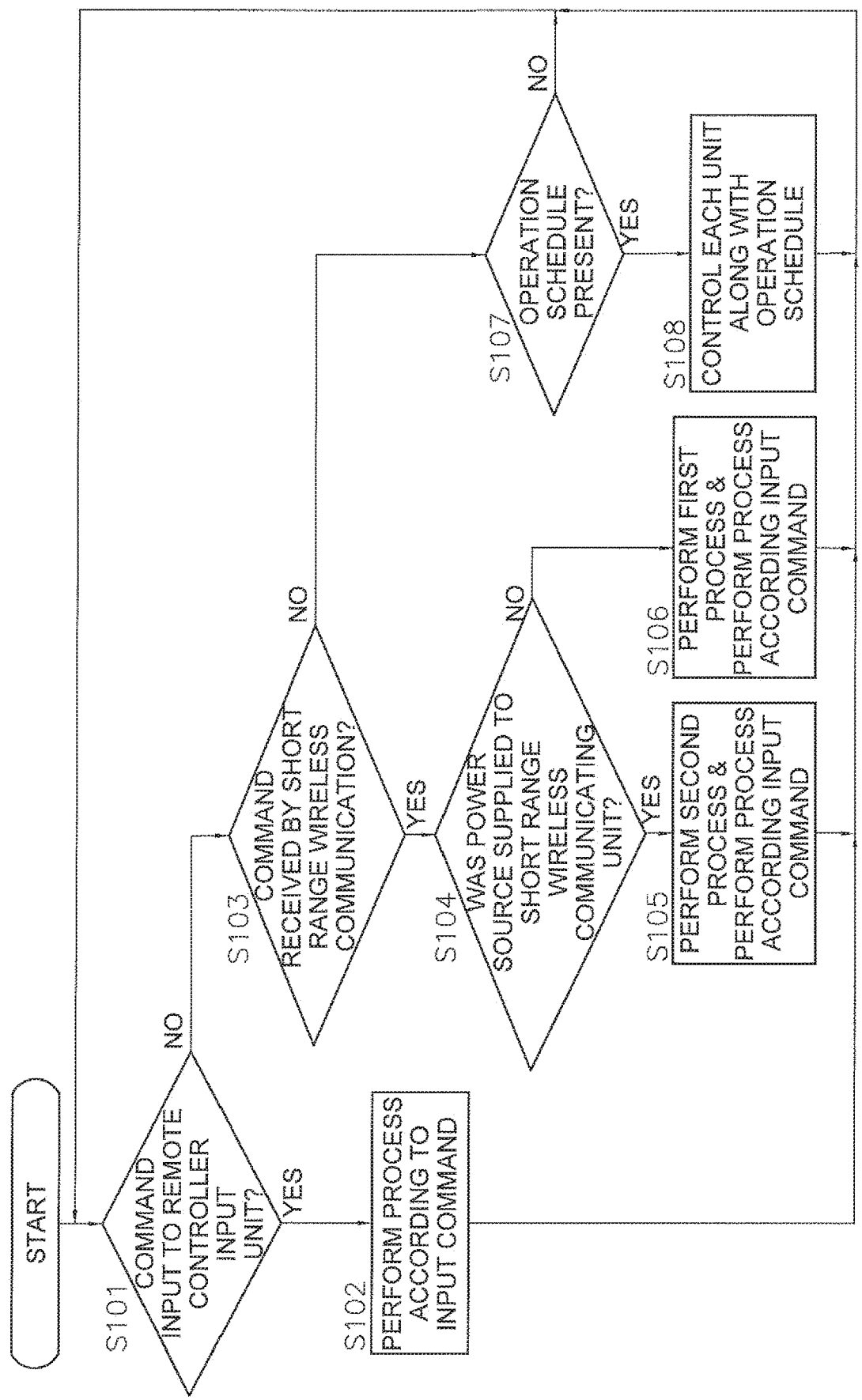
FIG. 15 is a flowchart showing one example of a flow of processes of the air conditioning system.

Hereinafter, referring to FIG. 15, one example of a process flow in the air conditioning system 100 will be described. FIG. 15 is a flowchart showing one example of a process flow in the air conditioning system 100.

The air conditioning system 100 performs a process in a flow shown from step S101 to step S108 in FIG. 15. Note that the process flow shown in FIG. 15 can be properly changed, and as long as the process is properly performed, the order of the steps may be replaced, two or more steps may be simultaneously performed, or another step (not shown) may be added.

In step S101, when no command is input to the air conditioning system 100 via the remote controller input unit 31 (that is, when No), the air conditioning system 100 proceeds to step S103. In contrast, when a command is input to the air conditioning system 100 via the remote controller input unit 31 (that is, when Yes), the air conditioning system 100 proceeds to step S102.

In step S102, the air conditioning system 100 performs a corresponding predetermined process based on the command input via the remote controller input unit 31. Then, the air conditioning system 100 returns to step S101.

In step S103, when receiving no command at the short range wireless communicating unit 34 from the terminal 110 by the short range wireless communication (that is, when No), the air conditioning system 100 proceeds to step S107. In contrast, when receiving a command from the terminal 110 at the short range wireless communicating unit 34 by the short range wireless communication (that is, when Yes), the air conditioning system 100 proceeds to step S104.

In step S104, in a case of the command input was performed in a state that the short range wireless communicating unit 34 is not supplied with the power source (that is, when No), the air conditioning system 100 proceeds to step S106. In contrast, in a case of the command input was performed in a state that the short range wireless communicating unit 34 is supplied with the power source (that is, when Yes), the air conditioning system 100 proceeds to step S105.

In step S105, the air conditioning system 100 performs the second process. That is, in a state of being supplied with the power source, the short range wireless communicating unit 34 (the unit CPU 343) acquires a command from the approaching terminal 110, and makes a transition to the second processing mode, and outputs the reception command at the communication circuit 341 to the remote controller control unit 35 without storing the reception command in the unit storage unit 342. As a result thereof, the reception command is input in the remote controller control unit 35. Then, the air conditioning system 100 performs a process corresponding to the reception command. Then, the air conditioning system 100 returns to step S101.

In step S106, the air conditioning system 100 performs the first process. That is, in a state of not being supplied with the power source, the short range wireless communicating unit 34 (the unit CPU 343) gets supplied with a power and also receives a command from the terminal 110 approaching the short range wireless communicating unit 34. The short range wireless communicating unit 34 then makes a transition to the first processing mode and stores the reception command at the communication circuit 341 into the unit storage unit 342. As a result thereof, the reception command stored in the unit storage unit 342 is acquired by the remote controller control unit 35 (the command acquiring unit 52), and the reception command is input into the remote controller control unit 35. Then, the air conditioning system 100 performs a process corresponding to the reception command. Then, the air conditioning system 100 returns to step S101.

In step S107, without no operation schedule (specifically, when the operation schedule storage area 514 stores no operation schedule, that is, when No), the air conditioning system 100 returns to step S101. In contrast, with an operation schedule (specifically, when the operation schedule storage area 514 stores an operation schedule, that is, when Yes), the air conditioning system 100 proceeds to step S103.

In step S108, along with the operation schedule, the air conditioning system 100 controls the operations of the respective units (especially, the outdoor unit 10 and each of the indoor units 20). Then, the air conditioning system 100 returns to step S101.

(6) CHARACTERISTICS OF AIR CONDITIONING SYSTEM 100

6-1

The air conditioning system 100 according to the above embodiment can easily input a command to a plurality of remote controllers 30.

That is, in a facility such as building, factory, warehouse, public facility where a plurality of air conditioning indoor units is installed, a plurality of remote control devices is installed according to the number of air conditioning indoor units. Because of such installation of the remote control devices, when various settings like those described above are performed, commands are individually input to the respective remote control devices in some cases. In such cases, with the conventional air conditioning system, each command has to be input by operating the input keys with respect to each of the plurality of remote control devices. As a result, the setting operation becomes complicated, making it difficult reduce the possibility of increase in labor and time required for the operation and the occurrence of setting errors, for example. In this situation, a demand for an air conditioning system has been recently uprising, in which command input to a plurality of remote control devices can be more easily performed.

In this respect, with the air conditioning system 100 according to the above embodiment, each of the remote controllers 30 has the short range wireless communicating unit 34 configured and arranged to perform the short range wireless communication with the terminal 110 which has the function of the short range wireless communicating. Also, each of the remote controllers 30 is configured and arranged to be input a command by receiving a signal transmitted from terminal 110 by short range wireless communication, at the short range wireless communicating unit 34. With this configuration, in a case where command inputs are performed to each of a plurality of remote controllers 30 for performing various settings, it is made possible to transmit the commands from the terminal 110 to the remote controller 30 by short range wireless communication. That is, the commands that have been input or stored in advance in the terminal 110 can be transmitted to each of the remote controllers 30 by the short range wireless communication.

As a result thereof, without operation of the remote controller input unit 31 (input key) of each of the remote controllers 30, commands can be input to the plurality of remote controllers 30. Thus, command inputs to the plurality of remote controllers 30 is facilitated. That is, the extensively complicated work for various settings can be decreased, which reduces the possibility of increase in the labor and time required for the operation and the occurrence of setting errors, for example.

6-2

With the air conditioning system 100 according to the above embodiment, the commands input to the remote controller 30 include the commands for the initial settings of the indoor unit 20 or of the remote controller 30, the initial settings being performed at the time of installation of or at the time of maintenance of the indoor unit 20 or the remote controller 30. With this configuration, when the initial settings are performed at the time of installation of or at the time of maintenance of the indoor unit 20, the operations for the initial settings can be avoided from the complication, which reduces the possibility of increase in the labor and time required for the operation and the occurrence of setting errors, for example.

6-3

In the air conditioning system 100 according to the above embodiment, the respective commands that are input at the time of the initial setting include commands shown in the following (A) to (E):
(A) Local information registration setting command for local information registration setting;
(B) Time setting command for setting the time information held by the air conditioning system 100 (that is, time setting for performing a time adjustment on a clock function of the remote controller 30);
(C) Sensor to-use selecting command for setting a detection value of which sensor, i.e., the sensor 22 incorporated in the indoor unit 20 and the sensor 33 incorporated in the remote controller 30, is to be used concerning the room temperature displayed in the remote controller 30 (that is, a temperature sensor selecting setting for selecting the temperature sensor which becomes an evaluation target in a case of a plurality of temperature sensors disposed in the target space SP);
(D) Filter sign notification setting command for setting of timing for displaying the notification information for prompting the maintenance of the filter 201 in the remote controller 30 (that is, notification timing setting for determining the timing for notification for prompting the maintenance of the filter 201 of the indoor unit 20); and
(E) Display mode setting command for setting the display mode of the remote controller displaying unit 32 of each of the remote controllers 30 (display mode setting).

Each of the commands (A) to (E) above is for the settings that can be complicated conventionally specifically in terms of command input. However, in the air conditioning system 100, the operations for the above settings can be avoided from the complication, which reduces the possibility of increase in the labor and time required for the operation and the occurrence of setting errors, for example.

6-4

With the air conditioning system 100 according to the above embodiment, the commands input to the remote controller 30 include the data transmission requesting command as a command for requesting transmission of predetermined data to the remote controller 30 (air conditioning system 100). In addition, the controller 50 is configured to cause the data requested by the data transmission requesting command input to the remote controller 30 to be transmitted from the short range wireless communicating unit 34 to the terminal 110.

With this configuration, when the data transmission requesting command for the setting of the data transmission to a plurality of remote controllers 30 is input, which was conventionally complicated especially in terms of command input, the operation can be avoided from the complication, which reduces the possibility of increase in the labor and time required for the operation and the occurrence of setting errors, for example.

6-5

With the air conditioning system 100 according to the above embodiment, the controller 50 stores the data which may be requested by the data transmission requesting command in the transmission data storage area 523, and the transmission data storage area 523 is included in the remote controller storage unit 351. With this configuration, the information which may be requested by the data transmission requesting command can be preliminarily stored in the remote controller 30 (the remote controller storage unit 351). As a result thereof, when the data transmission requesting command is input, time for transferring the data to the terminal 110 can be reduced. Thus, the operation time for acquiring the data in the air conditioning system 100 can be further shortened.

6-6

With the air conditioning system 100 according to the above embodiment, the data transmitted from the remote controller 30 to the terminal 110 corresponding to the input data transmission requesting command includes specifying data. The specifying data is information capable of specifying the difference in setting items between the state before switching and the state after the switching, the items having setting content that has been switched based on respective commands.

With this configuration, the specifying data can be transmitted from the remote controller 30 to the terminal 110 based on the data transmission requesting command, the specifying data capable of specifying the difference in setting items between the state before a switching and the state after the switching, the items having setting content that has been switched based on respective commands. As a result thereof, the difference identified by the specifying data can be displayed on the terminal 110 that has acquired the specifying data or on an information processing apparatus to which the specifying data is transferred from the terminal 110. Accordingly, an operator can easily grasp the difference in the setting items between the state before a switching and the state after the switching, the items having setting content that has been switched, which improves convenience of the system. In addition, the acquired specifying data can be promptly analyzed or processed in the installation place (the target space SP), thus improving the convenience.

6-7

With the air conditioning system 100 according to the above embodiment, the short range wireless communicating unit 34 has the unit storage unit 342 for storing the input commands, and the unit CPU 343 for performing a process in one of the first processing mode and the second processing mode when a command is input from the terminal 110. The first processing mode is a mode for storing the input commands in the unit storage unit 342. The second processing mode is a mode for outputting the input commands to the controller 50 without storing the input commands in the unit storage unit 342. The unit CPU 343 is configured so that: in a state of not being supplied with a power source, upon receiving a power source and input of a command by the approaching terminal 110, the unit CPU 343 performs the first process in the first processing mode; and in a state of being supplied with a power source, upon receiving input of a command, the unit CPU 343 performs the second process in the second processing mode.

With this configuration, regardless of whether or not the power source is supplied to the short range wireless communicating unit 34, commands can be input by the short range wireless communication. Also, when a command is input in a state where the short range wireless communicating unit 34 is being supplied with a power source, the input command is output to the controller without being stored in the unit storage unit 342. Thus, compared with the case in which the command is input in the state where the short range wireless communicating unit is not supplied with a power source, the transmission time for the input command is reduced, thus shortening the time until the result for the input command is reflected. Thus, the possibility of increase in the labor and time required for the operations for various settings are further decreased.

6-8

With the air conditioning system 100 according to the above embodiment, the commands input to the remote controller 30 include the schedule setting command as a command for setting of the operation schedule of the indoor unit 20. With this configuration, when the setting for the registration of the operation schedule is performed which was conventionally complicated especially in terms of command input, the operations for the settings can be avoided from the complication, thus decreasing the labor and time required for the operation, the occurrence of any setting error, etc.

6-9

With the air conditioning system 100 according to the above embodiment, each of the remote controllers 30 is assigned the central control address that is used for the communication with the central remote controller 40. The commands input to the remote controller 30 include the central control address setting command as a command for setting the central control address. With this configuration, when the setting of the central control address is performed which was conventionally complicated especially in terms of command input, the operations for the settings can be avoided from the complication, which reduces the possibility of increase in the labor and time required for the operation and the occurrence of setting errors, for example.

6-10

With the air conditioning system 100 according to the above embodiment, during the communication with the indoor unit 20 via the remote controller communicating unit 353, the remote controller displaying unit 32 of the remote controller 30 displays the communication state notification information showing that the communication with the indoor unit 20 is under way.

This has improved convenience. For example, even when a long time is required for the communication between the remote controller 30 and the indoor unit 20, the operator can grasp the progress state of the process for the command, thus improving convenience. Furthermore, when an input of a command is necessary every time the communication between the remote controller 30 and the indoor unit 20 is completed (that is, when a command needs to be input to the remote controller 30 several times), the timing of inputting the command can be easily grasped, thus improving convenience.

(7) MODIFIED EXAMPLES

The above embodiment may be properly modified as shown in the following modified examples. It should be noted that, the respective modified examples may be applied in combination with another modified example as far as no contradiction occurs.

(7-1) Modified Example A

In the above embodiment, the commands that are input to the air conditioning system 100 have been described with the examples, including the operation state switching command, the local information registration setting command, the schedule setting command, the central address setting command, the time setting command, the sensor to-use selecting command, the filter sign notification setting command, the display mode setting command, and the data transmission requesting command. However, the commands input to the air conditioning system 100 are not necessarily limited to the above commands. Any of the above commands may be properly omitted based on the design specification or the installation environment. Furthermore, the command input to the air conditioning system 100 may include another command.

(7-2) Modified Example B

In the above embodiment, the data requested by the data transmission requesting command include, for example, the history information for specifying, the operation state, failure timing, etc. of the air conditioning indoor unit, the information for specifying the operation state of various actuators (e.g., rotation speed of the compressor or of the fan, or opening degrees of various valves) at a predetermined time, the information for specifying the detected values of various sensors at a predetermined time, the information for specifying the setting states for various settings at a predetermined time, or the information data about power consumption, or the specifying data capable of specifying a difference in setting items between the state before a switching and the state after the switching, the items having setting content that has been switched based on respective commands. However, the data requested by the data transmission requesting command is not necessarily limited to the above data and may be other data.

(7-3) Modified Example C

In the air conditioning system 100 according to the above embodiment, the short range wireless communicating unit 34 (the unit CPU 343) is configured that, when the short range wireless communicating unit 34 that is in a state of not being supplied with a power source gets supplied with a power source and receives a command input from the terminal 110 approaching the short range wireless communicating unit 34, the short range wireless communicating unit 34 performs the first process in the first processing mode, while when the short range wireless communicating unit 34 in a state of being supplied with the power source has the command input, the short range wireless communicating unit 34 performs the second process in the second processing mode. In this respect, from the viewpoint of reducing the time for transmitting the command to the controller 50, the performing of the second process is preferable, however, the second process does not necessarily need to be performed in the air conditioning system 100. That is, the second processing mode (the second process) may be properly omitted, and, a configuration is possible in which even when a command is input to the short range wireless communicating unit 34 (the unit CPU 343) while it is in a state of being supplied with a power source, the short range wireless communicating unit 34 performs the first process (a process for storing the input command in the unit storage unit 342).

(7-4) Modified Example D

In the above embodiment, the local information table TB3 is the information (local information) on the installation place of each of the indoor units 20, and, in particular, is the information for specifying the ceiling height, largeness, existing floor, identification name, etc. of the target space SP. However, without being limited to this, the local information table TB3 may be anything which specifies other information. For example, the local information table TB3 may be any positional information such as location, etc., of the target space SP, or any information for specifying whether or not the summer time is put into practice in the target space SP.

(7-5) Modified Example E

In the above embodiment, the indoor units 20 are installed in the facility 1 including a plurality of target spaces SP. However, the environment for installing the indoor units 20 is not specifically limited thereto and may be installed in any environment. For example, the indoor units 20 may be installed in a factory or the like which includes a single large target space SP.

(7-6) Modified Example F

In the above embodiment, the air conditioning system 100 includes the central remote controller 40. However, the central remote controller 40 is not necessarily needed and may be properly omitted.

(7-7) Modified Example G

In the above embodiment, each of the units is assigned a plurality of communication addresses (specifically, the unit address and the central control address). However, each of the units does not need to be assigned the plurality of communication addresses, and any of the unit address and the central control address may be properly omitted. In such a case, the signal transmission between respective units may be performed by using one of the unit address and the central control address.

(7-8) Modified Example H

In the above embodiment, when the communication is being performed with the indoor unit 20 via the remote controller communicating unit 353, the remote controller displaying unit 32 of the remote controller 30 is configured to display the communication state notification information showing that the indoor unit 20 is in communication. However, the mode for outputting the communication state notification information may be properly changed. For example, when the remote controller 30 includes a speaker capable of outputting a sound, the speaker may be configured to output a sound equivalent to the communication state notification information, instead of the displaying the communication state notification information on the remote controller displaying unit 32. Furthermore, for example, when the remote controller 30 includes a light source unit such as an LED lamp, the light source unit may be configured to light up or blink as information equivalent to the communication state notification information, instead of the displaying the communication state notification information on the remote controller displaying unit 32. In addition, the output of the communication state notification information on the remote controller 30 is not necessarily essential and may be properly omitted.

(7-9) Modified Example I

In the above embodiment, the central remote controller 40 is disposed on the wide area network 120 (WAN). However, the central remote controller 40 does not necessarily need to be disposed on the wide area network 120 and may be disposed on any LAN (Local Area Network) established within the premise of the facility 1.

(7-10) Modified Example J

In the above embodiment, the remote controllers 30 respectively correspond to the indoor unites 20 on a one-to-one basis. However, the remote controller 30 may correspond to a plurality of indoor units 20. That is, a configuration is possible in which each remote controller 30 corresponds to two or more of the indoor units 20 on a one-to-many basis.

(7-11) Modified Example K

In the above embodiment, the short range wireless communicating unit 34 is provided separately from the remote controller control unit 35. However, the short range wireless communicating unit 34 may be included in the remote controller control unit 35.

(7-12) Modified Example L

In the above embodiment, the outdoor unit control unit 13, the indoor unit control units 23, the remote controller control units 35 and the central remote controller 40 are individually disposed. However, without being limited to this, the entire or a part of the outdoor unit control unit 13, the entire or a part of the indoor unit control units 23, the entire or a part of the remote controller control units 35, and/or the central remote controller 40 may be integrally configured. In such a case, the integrally configured control unit may be disposed in the outdoor unit 10, may be disposed in the indoor unit 20, may be disposed in the remote controller 30, may be disposed in the central remote controller 40, or may be disposed in a remote location connected via the LAN or the WAN.

(7-13) Modified Example M

In the above embodiment, the controller 50 is configured from the outdoor unit control unit 13, the indoor unit control unit 23 of each of the indoor units 20, the remote controller control unit 35 of each of the remote controllers 30, the central remote controller 40 that are all connected via the communication networks (NW, NW2, 120). However, the configuration mode of the controller 50 is not specifically limited thereto and may be properly changed. For example, the controller 50 may be configured with another added unit (e.g., the short range wireless communicating unit 34 or other external equipment, etc.), in place of any of or all together with the outdoor unit 10, each of the indoor units 20, each of the remote controllers 30 and the central remote controller 40. Furthermore, the controller 50 may be integrally configured from the respective units disposed in the same space, instead of being configured from the units disposed in different spaces, by connecting via a communication network.

(7-14) Modified Example N

In the above embodiment, the remote controllers 30 are each what is called a wired remote control device and are electrically connected with the corresponding indoor unit 20 via the communication cable cb2. However, the remote controller 30 may be a wireless remote controller which performs a wireless communication with the corresponding indoor unit 20 (the indoor unit control unit 23) by using a radio wave or an infrared ray. In such a case, the remote controller 30 may be each a handy-type remote controller which is portable.

(7-15) Modified Example O

In the above embodiment, the remote controllers 30 are each provided separately from the indoor units 20. However, the remote controller 30 do not necessarily need to be configured to be separate from the indoor unit 20 and may be configured to be integrated with the indoor unit 20 respectively. That is, the remote controller 30 may be incorporated in the indoor unit 20 respectively.

(7-16) Modified Example P

In the above embodiment, the remote controller displaying unit 32 as displaying means is provided in each of the remote controllers 30. However, the remote controller displaying unit 32 does not necessarily need to be provided in each of the remote controllers 30 and may be properly omitted. In such a case, the displaying unit for displaying the display data displayed on the remote controller displaying unit 32 may be provided in another unit (the outdoor unit 10, the indoor unit 20 or the central remote controller 40) or may be provided independent from the other units and thereby may be disposed in the target space SP or in another space.

(7-17) Modified Example Q

In the above embodiment, the short range wireless communication performed between the remote controller 30 and the terminal 110 is the NFC (Near Field Communication) using a frequency of 13.56 MHz. However, the short range wireless communication performed between the remote controller 30 and the terminal 110 does not necessarily need to be the NFC, and may be another method, for example, Bluetooth (registered trademark).

(7-18) Modified Example R

In the above embodiment, the unit address assigned to each of the units is the communication address preliminarily assigned before the factory shipment, or the communication address automatically assigned based on the control program at the time of inputting of the power source. However, without being limited to this, the unit address, as in the case of the central control address, may be assigned by the initial setting performed at the time of installation or at the time of maintenance. In such a case, the unit address may be configured so as to be set up by outputting of a command from the terminal 110 to the remote controller 30.

(7-19) Modified Example S

In the above embodiment, the remote controller 30 is installed in the target spaces SP that is the same as the corresponding indoor unit 20. However, the remote controller 30 may be installed in a space different from the target space SP where the corresponding indoor unit 20 is installed.

(7-20) Modified Example T

In the above embodiment, one of the indoor units 20 is installed in each of the target spaces SP. However, a plurality of indoor units 20 may be installed in each of the target spaces SP.

(7-21) Modified Example U

In the above embodiment, the refrigerant circuit is configured from the refrigerant pipe that connects one outdoor unit 10 to a plurality of indoor units 20. However, the air conditioning system 100 may have a plurality of outdoor units 10. That is, the refrigerant circuit may be configured from a refrigerant pipe connecting between a plurality of outdoor units 10 and a plurality of indoor units 20. In such a case, the number of refrigerant systems included in the air conditioning system 100 may be singular or plural.

(7-22) Modified Example V

In the above embodiment, the indoor unit 20 is of a ceiling-embedded type installed in a ceiling. However, without being limited to this, the indoor unit 20 may be of any other type. For example, the indoor unit 20 may be an air conditioning indoor unit of wall hanging type to be installed on an internal wall of the target space SP, of floor type installed on a floor, or of under-floor type to be installed under a floor surface, for example.

(7-23) Modified Example W

In the above embodiment, the indoor unit 20 as "air conditioning indoor unit" is an indoor unit of an air conditioner. However, without being limited to this, the indoor unit 20 may be another device which is installed in the target space SP and conditions the air inside: examples of the device including an air cleaner, a ventilator, or a dehumidifier, etc. Furthermore, the indoor unit 20 may be a heat pump device that includes a refrigerant circuit: examples of the heat pump device including a hot water dispenser.

(7-24) Modified Example X

In the above embodiment, the terminal 110 has the touch screen 111 as command inputting means for inputting the commands. However, the terminal 110 does not necessarily need to have the command inputting means such as the touch screen 111. When the terminal 110 has a command fetching unit for fetching in commands from a storage medium storing the commands, the command inputting means may be properly omitted.

INDUSTRIAL APPLICABILITY

The present invention is applicable to an air conditioning system having a plurality of remote control devices.

What is claimed is:

1. An air conditioning system comprising:
a plurality of air conditioning indoor units installed in a target space, each of the plurality of air conditioning indoor units including an indoor heat exchanger;
a plurality of remote control devices corresponding to the air conditioning indoor units, each remote control device being configured and arranged to have a command input therein to set the corresponding air conditioning indoor unit or the remote control device itself, each of the plurality of remote control devices being connected to the corresponding air conditioning indoor unit by a wire; and
a controller configured and arranged to perform a process based on the command input to each remote control device,
the plurality of remote control devices each including
a communicating unit configured and arranged to perform a communication with the corresponding air conditioning indoor unit, and
a short range wireless communicating unit configured and arranged to perform a short range wireless communication with a communicating apparatus having a function of the short range wireless communication, the short range wireless communication being a near field communication, and
the command being input by receiving a signal transmitted from the communicating apparatus by the short range wireless communication, at the short range wireless communicating unit,
the command including an initial setting command for an initial setting of the air conditioning indoor unit or of the remote control device, the initial setting being performed at a time of installation or at a time of maintenance, the initial setting including
a local information registration setting usable to register local information of the target space,
a time setting usable to adjust a time of a clock function in the remote control device,
a temperature sensor selecting setting usable to select a temperature sensor which becomes a target of measurement in a case in which a plurality of temperature sensors are disposed in the target space,
a notification timing setting usable to determine a timing of performing a notification prompting cleaning or changing of a filter of the air conditioning indoor unit, and
a display mode setting for determining a display mode of a displaying unit of the remote control device.

2. The air conditioning system according to claim 1, wherein
the command includes a data transmission requesting command as a command requesting a transmission of predetermined data, and
the controller causes, the data requested by the data transmission requesting command that is input to the remote control device, to be transmitted from the short range wireless communicating unit to the communicating apparatus.

3. The air conditioning system according to claim 2, wherein
the plurality of remote control devices each further include a transmission data storage unit configured and arranged to store the data to be transmitted to the communicating apparatus in response to input of the data transmission requesting command, and
the controller stores, in the transmission data storage unit, the data which may be requested by the data transmission requesting command.

4. The air conditioning system according to claim 2, wherein
the data transmitted from the remote control device to the communicating apparatus in response to input of the data transmission requesting command includes a specifying data, and
the specifying data is information capable of specifying a difference between a state before a switching and a state after the switching in setting items of which setting content has been switched based on the command.

5. The air conditioning system according to claim 1, wherein
the short range wireless communicating unit includes:
an input command storage unit configured and arranged to store the command that is input, and
a processing unit configured and arranged to perform a process, in a case that the command is input from the communicating apparatus, by one of a first processing mode storing the command being input into the input command storage unit and a second processing mode outputting the command being input to the controller without storing into the input command storage unit, and
the processing unit is further configured and arranged
to perform the process in the first processing mode when the processing unit, by being approached by the communicating apparatus, in a state of not being supplied with power gets supplied with the power and is input a command, and
to perform the process in the second processing mode when the processing unit receives the command input in a state of being supplied with the power.

6. The air conditioning system according to claim 1, wherein
the command includes a schedule setting command usable to set an operation schedule of the air conditioning indoor unit.

7. The air conditioning system according to claim 1, wherein
each of the plurality of remote control devices is assigned a central address used for a communication with a central remote controller that integrally controls operations of the plurality of the air conditioning indoor units or of the plurality of the remote control devices, and
the command includes a central address setting command usable to set the central address.

8. The air conditioning system according to claim 1, wherein
the plurality of remote control devices each further includes a communication state displaying unit configured and arranged to display information indicating that the remote control device is in communication with the air conditioning indoor unit when the remote control device is communicating with the air conditioning indoor unit via the communicating unit.

9. The air conditioning system according to claim 2, wherein
the short range wireless communicating unit includes:
an input command storage unit configured and arranged to store the command that is input, and
a processing unit configured and arranged to perform a process, in a case that the command is input from the communicating apparatus, by one of a first processing mode storing the command being input into the input command storage unit and a second processing mode outputting the command being input to the controller without storing into the input command storage unit, and
the processing unit is further configured and arranged
to perform the process in the first processing mode when the processing unit, by being approached by the communicating apparatus, in a state of not being supplied with power gets supplied with the power and is input a command, and
to perform the process in the second processing mode when the processing unit receives the command input in a state of being supplied with the power.

10. The air conditioning system according to claim 5, wherein
the command includes a schedule setting command usable to set an operation schedule of the air conditioning indoor unit.

11. The air conditioning system according to claim 5, wherein
each of the plurality of remote control devices is assigned a central address used for a communication with a central remote controller that integrally controls operations of the plurality of the air conditioning indoor units or of the plurality of the remote control devices, and
the command includes a central address setting command usable to set the central address.

12. The air conditioning system according to claim 5, wherein
the plurality of remote control devices each further includes a communication state displaying unit configured and arranged to display information indicating that the remote control device is in communication with the air conditioning indoor unit when the remote control device is communicating with the air conditioning indoor unit via the communicating unit.

13. The air conditioning system according to claim 6, wherein
each of the plurality of remote control devices is assigned a central address used for a communication with a central remote controller that integrally controls operations of the plurality of the air conditioning indoor units or of the plurality of the remote control devices, and
the command includes a central address setting command usable to set the central address.

14. The air conditioning system according to claim 6, wherein
the plurality of remote control devices each further includes a communication state displaying unit configured and arranged to display information indicating that the remote control device is in communication with the air conditioning indoor unit when the remote control device is communicating with the air conditioning indoor unit via the communicating unit.

15. The air conditioning system according to claim 7, wherein
the plurality of remote control devices each further includes a communication state displaying unit configured and arranged to display information indicating that the remote control device is in communication with the air conditioning indoor unit when the remote control device is communicating with the air conditioning indoor unit via the communicating unit.

* * * * *